United States Patent
Balasubramanian et al.

(10) Patent No.: US 11,050,543 B1
(45) Date of Patent: Jun. 29, 2021

(54) TECHNIQUES FOR CONFIGURING BEAM-SPECIFIC FEEDBACK FOR SIDELINK COMMUNICATIONS

(71) Applicant: QUALCOMM Incorporated, San Diego, CA (US)

(72) Inventors: Anantharaman Balasubramanian, San Diego, CA (US); Shuanshuan Wu, San Diego, CA (US); Sudhir Kumar Baghel, Hillsborough, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/886,631

(22) Filed: May 28, 2020

(51) Int. Cl.
*H04L 5/00* (2006.01)
*H04B 7/06* (2006.01)
*H04W 28/04* (2009.01)
*H04W 92/18* (2009.01)

(52) U.S. Cl.
CPC ......... *H04L 5/0055* (2013.01); *H04B 7/0695* (2013.01); *H04L 5/0023* (2013.01); *H04L 5/0094* (2013.01); *H04W 28/04* (2013.01); *H04W 92/18* (2013.01)

(58) Field of Classification Search
CPC . H04W 92/18; H04W 28/04; H04W 72/0493; H04W 72/1231; H04W 72/14; H04W 76/11; H04W 72/02; H04L 5/0055; H04L 5/005; H04L 5/0053; H04L 5/0048; H04L 5/0035; H04L 5/0057; H04L 5/0058; H04L 5/0092; H04L 5/0023; H04L 5/0094; H04B 7/0695
See application file for complete search history.

(56) References Cited

U.S. PATENT DOCUMENTS

| | | |
|---|---|---|
| 2019/0281587 A1 | 9/2019 | Zhang et al. |
| 2019/0380053 A1 | 12/2019 | Bai et al. |
| 2020/0037343 A1 | 1/2020 | He et al. |
| 2020/0092692 A1 | 3/2020 | Wang et al. |
| 2020/0099479 A1* | 3/2020 | Park ...................... H04L 1/1896 |
| 2020/0106566 A1 | 4/2020 | Yeo et al. |
| 2020/0260231 A1* | 8/2020 | Ganesan .............. H04B 7/0695 |
| 2020/0351028 A1* | 11/2020 | Wang ................... H04L 1/1887 |
| 2020/0389257 A1* | 12/2020 | Kung .................... H04L 1/1812 |

(Continued)

*Primary Examiner* — Khanh C Tran
(74) *Attorney, Agent, or Firm* — Dalei Dong; Holland & Hart LLP

(57) ABSTRACT

Methods, systems, and devices for wireless communications are described. A user equipment (UE) may select a first and second directional beam for communicating with one or more UEs on a first and second sidelink communication link. In some cases, the UE may identify a first sidelink feedback configuration for the first directional beam. The UE may also identify a second sidelink feedback configuration for the second directional beam, where the second sidelink configuration may be different from the first sidelink feedback configuration. In some examples, the UE may transmit an indication of the first sidelink feedback configuration and the second sidelink feedback configuration to the one or more UEs, where received feedback for sidelink messages sent over the directional beams may be based on the different sidelink feedback configurations. In addition, feedback resources may be based on a beam identifier of a beam used to transmit an initial sidelink message.

30 Claims, 14 Drawing Sheets

(56) References Cited

U.S. PATENT DOCUMENTS

| | | | |
|---|---|---|---|
| 2021/0014831 A1* | 1/2021 | Ryu | H04W 72/0493 |
| 2021/0028891 A1* | 1/2021 | Zhou | H04L 1/1819 |
| 2021/0037534 A1* | 2/2021 | Ji | H04W 80/02 |
| 2021/0045066 A1* | 2/2021 | Akkarakaran | H04W 72/042 |

* cited by examiner

TECHNIQUES FOR CONFIGURING BEAM-SPECIFIC FEEDBACK FOR SIDELINK COMMUNICATIONS

FIELD OF TECHNOLOGY

The present disclosure relates to wireless communications and more specifically to techniques for configuring beam-specific feedback for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support a number of UEs which may be capable of direct communication with each other (e.g., via sidelink communication links). In such systems, transmissions between devices (e.g., between a base station and a UE 115, between different UEs, between different vehicles, or the like) may be performed using messages transmitted in various beam directions. For instance, a transmitting UE may send sidelink messages to different UEs in different beam directions. However, in some cases, selecting resources for transmitting feedback responsive to sidelink messages may be complex, leading to inefficiencies in the system. Moreover, receiving UEs may not know how or when to receive retransmissions of sidelink messages, for example, after providing feedback to the transmitting UE.

SUMMARY

The described techniques relate to improved methods, systems, devices, and apparatuses that support techniques for configuring beam-specific feedback for sidelink communications. The described techniques provide for the configuration of different feedback schemes for different directional beams, where feedback for sidelink messages received on different beams may include different information based on the configurations. For example, a transmitting user equipment (UE), which may be an example of a vehicle that supports vehicle-to-everything (V2X) communications, device-to-device (D2D) communications, or the like, may select different directional beams for sidelink communications with other UEs. In such cases, a first beam may be associated with a first sidelink communication link with a first UE, and a second beam may be associated with a second sidelink communication link with a second, different UE. The transmitting UE may identify a different sidelink feedback configuration for each of the first beam and the second beam. As an example, the transmitting UE may configure the first beam with acknowledgment (ACK) and negative acknowledgment (NACK) feedback, whereas the second beam may be configured with NACK-only feedback. In such cases, the different sidelink configurations may be based on a priority of communications over the first beam and the second beam, for example, where the first beam may have a higher priority than the second beam. In any case, the transmitting UE may transmit an indication of the respective sidelink feedback configurations to the first UE and the second UE, which may be transmitted using sidelink control information (SCI), radio resource control (RRC) signaling (e.g., via a PC5 RRC message), or any combination thereof. The use of beam-specific sidelink feedback configurations may enable the transmitting UE to effectively receive feedback for sidelink messages sent on beams having different priority, where higher-priority beams may provide additional feedback granularity compared to lower-priority beams, thus increasing the reliability of communications between UEs.

The first UE and second UE may, in turn, provide feedback to sidelink messages received over the first and second beam, respectively, in accordance with the sidelink feedback configurations. In such cases, the resources selected for the feedback messages may be based on a beam identifier (ID) corresponding to the beam on which a sidelink message was received, as well as a transmitter ID and the resources in which the sidelink message was received. Further, the transmission, and retransmission, of sidelink messages over different beams may be based on one or more transmit control indicator (TCI) states. For instance, a first TCI state may indicate that an initial transmission of a sidelink message may be sent over the first beam and during some time interval (e.g., a slot), and one or more retransmission of the sidelink message may be sent on the first beam and another beam during one or more additional time intervals. Other TCI states may indicate other beams and slots for transmissions and retransmissions. As such, a receiving UE may know how and when retransmissions of the sidelink message may be received, thereby enhancing efficiency and reliability in the system.

A method of wireless communication at a UE is described. The method may include selecting a first directional beam and a second directional beam for communicating with one or more UEs over a first sidelink communication link associated with the first directional beam and a second sidelink communication link associated with the second directional beam, identifying a first sidelink feedback configuration for the first directional beam and a second sidelink feedback configuration for the second directional beam, the second sidelink feedback configuration being different than the first sidelink feedback configuration, and transmitting, to the one or more UEs, an indication of the identified first sidelink feedback configuration and the second sidelink feedback configuration.

An apparatus for wireless communication at a UE is described. The apparatus may include a processor, memory coupled with the processor, and instructions stored in the memory. The instructions may be executable by the processor to cause the apparatus to select a first directional beam and a second directional beam for communicating with one or more UEs over a first sidelink communication link associated with the first directional beam and a second sidelink communication link associated with the second directional beam, identify a first sidelink feedback configuration for the first directional beam and a second sidelink feedback configuration for the second directional beam, the second sidelink feedback configuration being different than the first sidelink feedback configuration, and transmit, to the one or more UEs, an indication of the identified first sidelink feedback configuration and the second sidelink feedback configuration.

Another apparatus for wireless communication at a UE is described. The apparatus may include means for selecting a first directional beam and a second directional beam for communicating with one or more UEs over a first sidelink communication link associated with the first directional beam and a second sidelink communication link associated with the second directional beam, identifying a first sidelink feedback configuration for the first directional beam and a second sidelink feedback configuration for the second directional beam, the second sidelink feedback configuration being different than the first sidelink feedback configuration, and transmitting, to the one or more UEs, an indication of the identified first sidelink feedback configuration and the second sidelink feedback configuration.

A non-transitory computer-readable medium storing code for wireless communication at a UE is described. The code may include instructions executable by a processor to select a first directional beam and a second directional beam for communicating with one or more UEs over a first sidelink communication link associated with the first directional beam and a second sidelink communication link associated with the second directional beam, identify a first sidelink feedback configuration for the first directional beam and a second sidelink feedback configuration for the second directional beam, the second sidelink feedback configuration being different than the first sidelink feedback configuration, and transmit, to the one or more UEs, an indication of the identified first sidelink feedback configuration and the second sidelink feedback configuration.

Some examples of the method, apparatuses, and non-transitory computer-readable medium described herein may further include operations, features, means, or instructions for transmitting, to a first UE of the one or more UEs, a first sidelink message over the first directional beam, and receiving, from the first UE, a first feedback message for the first sidelink message, the first feedback message including acknowledgement feedback or negative acknowledgment feedback in accordance with the first sidelink feedback configuration.

Some examples of the method, apparatuses, and non-transitory computer-readable medium described herein may further include operations, features, means, or instructions for identifying, based on a transmit control indicator state, one or more additional directional beams and one or more time periods for retransmitting the first sidelink message in response to the first feedback message, and retransmitting, to the first UE, at least a portion of the first sidelink message using the identified one or more additional directional beams and during the identified one or more time periods.

Some examples of the method, apparatuses, and non-transitory computer-readable medium described herein may further include operations, features, means, or instructions for transmitting, to the first UE, an indication of the transmit control indicator state using SCI, or RRC signaling, or any combination thereof.

Some examples of the method, apparatuses, and non-transitory computer-readable medium described herein may further include operations, features, means, or instructions for identifying the transmit control indicator state from a set of transmit control indicator states.

In some examples of the method, apparatuses, and non-transitory computer-readable medium described herein, the first feedback message may be received on a first set of resources that correspond to a beam identifier of the first directional beam, an identifier of the first UE, and a second set of resources used for transmitting the first sidelink message.

Some examples of the method, apparatuses, and non-transitory computer-readable medium described herein may further include operations, features, means, or instructions for transmitting a second sidelink message to a second UE of the one or more UEs over the second directional beam, and receiving, from the second UE, a second feedback message for the second sidelink message, the second feedback message including negative acknowledgment feedback and excluding acknowledgment feedback in accordance with the second sidelink feedback configuration.

Some examples of the method, apparatuses, and non-transitory computer-readable medium described herein may further include operations, features, means, or instructions for determining a first priority for the first directional beam and a second priority for the second directional beam, the second priority being different than the first priority, where identifying the first sidelink feedback configuration for the first directional beam may be based on the first priority, and where identifying the second sidelink feedback configuration for the second directional beam may be based on the second priority.

In some examples of the method, apparatuses, and non-transitory computer-readable medium described herein, the first priority and the second priority may be based on a location of the one or more UEs, or a movement direction of the UE, or any combination thereof.

In some examples of the method, apparatuses, and non-transitory computer-readable medium described herein, the first directional beam and the second directional beam may be associated with a same set of physical resource blocks, a same set of subchannels, or a combination thereof.

In some examples of the method, apparatuses, and non-transitory computer-readable medium described herein, transmitting the indication of the identified first sidelink feedback configuration and the second sidelink feedback configuration may include operations, features, means, or instructions for transmitting SCI that indicates one or both of the identified first sidelink feedback configuration or the second sidelink feedback configuration.

In some examples of the method, apparatuses, and non-transitory computer-readable medium described herein, transmitting the indication of the identified first sidelink feedback configuration and the second sidelink feedback configuration may include operations, features, means, or instructions for transmitting, to the one or more UEs, RRC signaling that indicates one or both of the identified first sidelink feedback configuration or the second sidelink feedback configuration.

In some examples of the method, apparatuses, and non-transitory computer-readable medium described herein, transmitting the indication of the identified first sidelink feedback configuration and the second sidelink feedback configuration may include operations, features, means, or instructions for transmitting the indication periodically, or dynamically, or any combination thereof, where the transmitted indication may be based on a location of the one or more UEs, or a movement direction of the UE, or any combination thereof.

A method of wireless communication at a first UE is described. The method may include receiving, from a second UE, an indication of a sidelink feedback configuration for a first directional beam associated with a sidelink communication link, determining, based on the sidelink feedback configuration, feedback for a sidelink message received from the second UE over the first directional beam, selecting a first set of resources for a feedback message based on a beam identifier of the first directional beam, an identifier of the second UE, and a second set of resources for the sidelink message, and transmitting, to the second UE, the feedback message including the determined feedback, the feedback message transmitted on the selected first set of resources in response to the sidelink message.

An apparatus for wireless communication at a first UE is described. The apparatus may include a processor, memory coupled with the processor, and instructions stored in the memory. The instructions may be executable by the processor to cause the apparatus to receive, from a second UE, an indication of a sidelink feedback configuration for a first directional beam associated with a sidelink communication link, determine, based on the sidelink feedback configuration, feedback for a sidelink message received from the second UE over the first directional beam, select a first set of resources for a feedback message based on a beam identifier of the first directional beam, an identifier of the second UE, and a second set of resources for the sidelink message, and transmit, to the second UE, the feedback message including the determined feedback, the feedback message transmitted on the selected first set of resources in response to the sidelink message.

Another apparatus for wireless communication at a first UE is described. The apparatus may include means for receiving, from a second UE, an indication of a sidelink feedback configuration for a first directional beam associated with a sidelink communication link, determining, based on the sidelink feedback configuration, feedback for a sidelink message received from the second UE over the first directional beam, selecting a first set of resources for a feedback message based on a beam identifier of the first directional beam, an identifier of the second UE, and a second set of resources for the sidelink message, and transmitting, to the second UE, the feedback message including the determined feedback, the feedback message transmitted on the selected first set of resources in response to the sidelink message.

A non-transitory computer-readable medium storing code for wireless communication at a first UE is described. The code may include instructions executable by a processor to receive, from a second UE, an indication of a sidelink feedback configuration for a first directional beam associated with a sidelink communication link, determine, based on the sidelink feedback configuration, feedback for a sidelink message received from the second UE over the first directional beam, select a first set of resources for a feedback message based on a beam identifier of the first directional beam, an identifier of the second UE, and a second set of resources for the sidelink message, and transmit, to the second UE, the feedback message including the determined feedback, the feedback message transmitted on the selected first set of resources in response to the sidelink message.

Some examples of the method, apparatuses, and non-transitory computer-readable medium described herein may further include operations, features, means, or instructions for identifying a transmit control indicator state associated with the one or more sidelink messages, identifying, based on the identified transmit control indicator state, one or more additional directional beams and one or more time periods for receiving one or more retransmissions of the sidelink message, and receiving, on a second directional beam from the one or more additional directional beams, a retransmission of at least a portion of the sidelink message in response to the feedback message.

In some examples of the method, apparatuses, and non-transitory computer-readable medium described herein, the sidelink message may be received within a first time period, and where the retransmission may be received within the one or more time periods based on the identified transmit control indicator state, the one or more time periods being subsequent to the first time period.

In some examples of the method, apparatuses, and non-transitory computer-readable medium described herein, identifying the transmit control indicator state may include operations, features, means, or instructions for receiving an indication of the transmit control indicator state via SCI, or RRC signaling, or any combination thereof.

In some examples of the method, apparatuses, and non-transitory computer-readable medium described herein, the identified transmit control indicator state may be from a set of transmit control indicator states.

In some examples of the method, apparatuses, and non-transitory computer-readable medium described herein, selecting the first set of resources for the feedback message may include operations, features, means, or instructions for selecting a set of resource blocks, or codes, or a combination thereof, for transmitting the determined feedback based on the beam identifier of the first directional beam, the identifier of the second UE, and the second set of resources for the sidelink message.

In some examples of the method, apparatuses, and non-transitory computer-readable medium described herein, receiving the indication of the sidelink feedback configuration may include operations, features, means, or instructions for receiving SCI that indicates the sidelink feedback configuration.

In some examples of the method, apparatuses, and non-transitory computer-readable medium described herein, receiving the indication of the sidelink feedback configuration may include operations, features, means, or instructions for receiving RRC signaling that indicates the sidelink feedback configuration.

In some examples of the method, apparatuses, and non-transitory computer-readable medium described herein, the determined feedback includes acknowledgment feedback or negative acknowledgment feedback for the sidelink message in accordance with the sidelink feedback configuration for the first directional beam.

In some examples of the method, apparatuses, and non-transitory computer-readable medium described herein, the determined feedback includes negative acknowledgment feedback and excludes acknowledgment feedback for the sidelink message in accordance with the sidelink feedback configuration for the first directional beam.

In some examples of the method, apparatuses, and non-transitory computer-readable medium described herein, the sidelink feedback configuration for the first directional beam may be based on a priority of the first directional beam, where the priority may be based on a location of the first UE, or a movement direction of the second UE, or any combination thereof.

DETAILED DESCRIPTION

Figure 1:
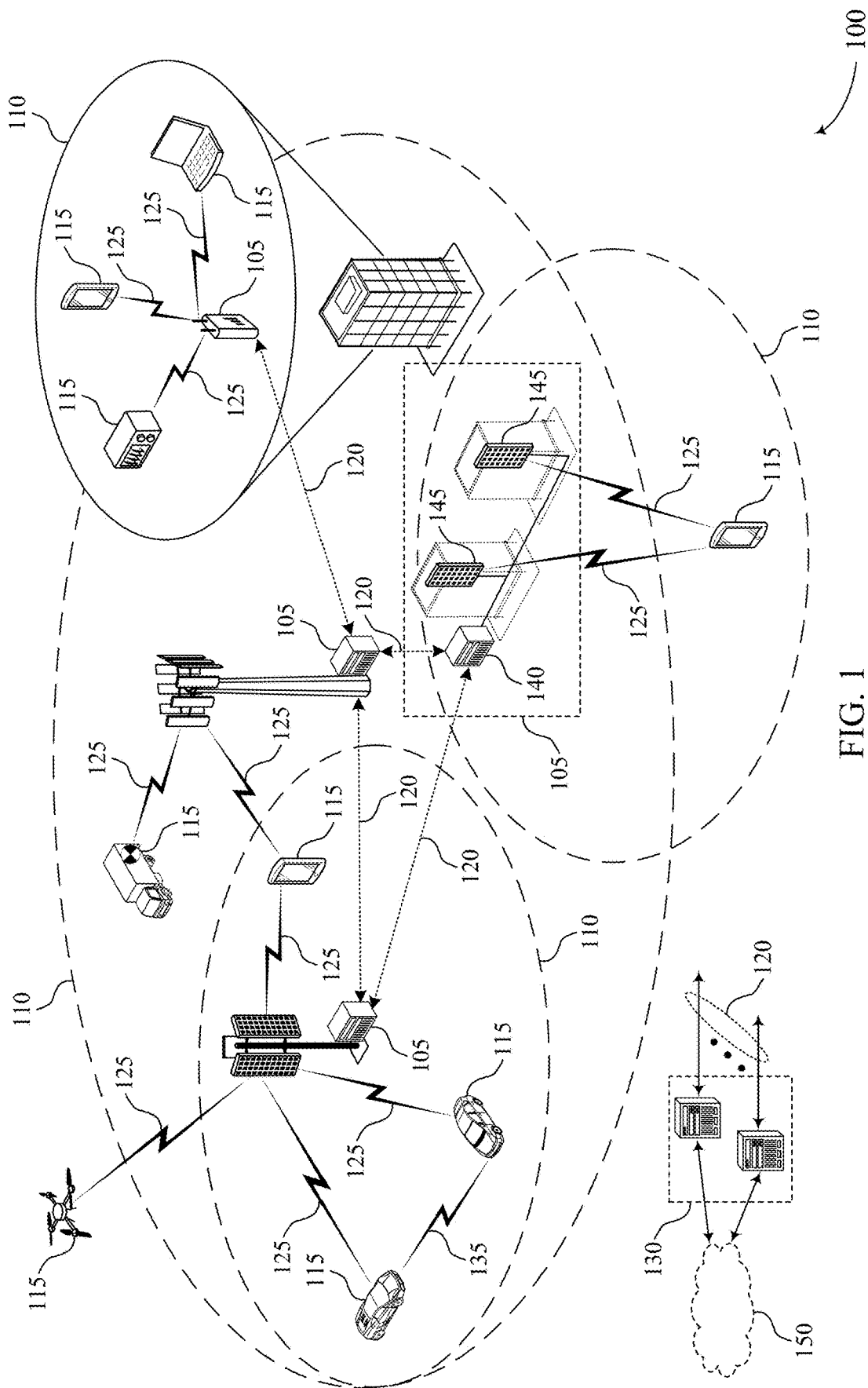
FIG. 1 illustrates an example of a wireless communications that supports techniques for configuring beam-specific feedback for sidelink communications in accordance with various aspects of the present disclosure.

Wireless systems may support both access links (e.g., Uu links) and sidelinks (e.g., PC5 links) for communications between wireless devices. For example, a user equipment (UE) may directly communicate with one or more other UEs via sidelink communications over a PC5 link. In such cases, a receiving UE may provide feedback to a transmitting UE to indicate if a received sidelink message was successful or if retransmission is needed, where sets of resources may be allocated for the sidelink feedback. For example, a receiving UE may select resources on a physical sidelink feedback channel (PSFCH) based on a transmitter identifier (ID) and a subchannel on which a sidelink message was received. In addition, sidelink communications may take place over directional beams, where a first UE may transmit (e.g., simultaneously) to one or more other UEs using the same resources (e.g., a same subchannel or set of physical resource blocks (PRBs)) on different beams.

In some examples, the transmitting UE may determine a higher priority for transmissions over a directional beam, for example, based on the transmitting UE's movement, proximity to other devices, or the like. As a result of different priorities assigned to different beams, it may be advantageous to also enable different feedback schemes that correspond to the beam priority, where a UE receiving messages on a relatively higher priority beam may provide more detailed or more granular feedback (e.g., acknowledgment (ACK)/negative acknowledgment (NACK) versus NACK-only). Further, UEs receiving communications on different beams may be unable to efficiently identify how to receive retransmissions from the first UE (e.g., on which beam or beams retransmissions may be received), which may cause issues when decoding retransmissions.

As described herein, UEs communicating via sidelink communications may configure the PSFCH for beam-specific feedback and retransmissions. More specifically, a transmitting UE may configure different feedback schemes for different directional beams, and a UE receiving a communication on a directional beam may provide feedback based on the configured feedback scheme for that beam. For instance, the transmitting UE may configure a first directional beam for ACK/NACK feedback while configuring a second directional beam for NACK-only feedback, which may be based on a priority assigned to the respective beams or a priority of the transmissions sent to the receiving UE. Accordingly, the UE(s) receiving transmissions on different beams may report feedback differently in accordance with the beam-specific PSFCH configuration.

Beam-specific feedback configurations (and reconfigurations) may be signaled via sidelink control information (SCI) or radio resource control (RRC) messaging (e.g., PC5 RRC signaling) and may indicate the type of feedback requested (i.e., either ACK/NACK, NACK-only, or the like). Additionally, the beam-specific feedback configurations may enable receiving UEs to transmit feedback based on beam identifiers corresponding to the beams, where the receiving UEs may use the respective beam IDs (along with subchannel ID and transmitter ID) to select resources on the PSFCH. The use of the beam ID for feedback for respective transmissions may enable each receiving UE to select different feedback resources.

Further, the beam-specific feedback configuration may enable receiving UEs to identify where to receive retransmission from the transmitting UE, which may be based on a transmit control indicator (TCI) state. Specifically, the initial transmissions and retransmissions from the transmitting UE may be based on TCI state information such that different TCI states may be mapped to different sets of resources (e.g., different beams, different time durations (e.g., slots), or any combination thereof) that indicate how and when retransmissions are to be transmitted/received. In such cases, a transmitting UE may provide all possible TCI state configurations to other UEs (e.g., though SCI or RRC messaging), and a receiving UE may use the TCI state to determine a beam or a slot, or both, in which a retransmission is to be received with respect to the initial transmission.

Aspects of the subject matter described herein may be implemented to realize one or more of the following technical improvements, among other advantages. The described techniques employed by wireless devices may, for example, provide benefits and enhancements to wireless communications carried out between UEs, which may include increased reliability for sidelink communications. For instance, the techniques described herein may increase reliability and reduce overhead when some directional beams (or the communications over such beams) have varying priority over other beams, resulting in more efficient and reliable wireless communications, thereby increasing data rates and link capacity. In some examples, signaling beam-specific sidelink feedback configurations may also enable increased flexibility for wireless communications between UEs. For instance, the beam-specific sidelink feedback configurations may be dynamically, semi-statically, or periodically signaled to other UEs, enabling increased configurability for communications in a wireless system. In addition, with respect to the examples of V2X communications, V2V communications, or the like, the described techniques may provide for enhanced safety through increased reliably of wireless communications, where a UE may ensure that messages are correctly received by other nearby devices based on the UE's direction of motion, speed, proximity to the other devices, or the like.

Aspects of the disclosure are initially described in the context of wireless communications systems. Further aspects are described with reference to resource configurations and process flows. Aspects of the disclosure are further illustrated by and described with reference to apparatus diagrams, system diagrams, and flowcharts that relate to techniques for configuring beam-specific feedback for sidelink communications.

FIG. 1 illustrates an example of a wireless communications system 100 that supports techniques for configuring beam-specific feedback for sidelink communications in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Wireless communications system 100 may support the use of different feedback schemes for different beams.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of some radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support techniques for configuring beam-specific feedback for sidelink communications. For instance, one or more devices in wireless communications system 100 may support the configuration of different feedback schemes for different directional beams, where feedback for sidelink messages received on different beams may include different information based on the configurations. As an example, a transmitting UE 115, which may be an example of a vehicle that supports V2X communications, V2V communications, D2D communications, or the like, may select different directional beams for sidelink communications with other UEs 115. In such cases, a first beam may be associated with a first sidelink communication link with a first UE 115, and a second beam may be associated with a second sidelink communication link with a second, different UE 115. The transmitting UE 115 may identify a different sidelink feedback configuration for the first beam and the second beam. As an example, the transmitting UE 115 may configure the first beam with ACK/NACK feedback, whereas the second beam may be configured with NACK-only feedback (e.g., excluding ACK feedback). In such cases, the different sidelink configurations may be based on a priority of communications over the first beam and the second beam, for example, where the first beam may have a higher priority than the second beam. Here, the priority may be based on the movement, position, location, or the like, of the transmitting UE 115, the first UE 115, the second UE 115, or any combination thereof. For instance, the transmitting UE 115 may be moving towards the first UE 115 and may therefore prioritize communications over the first beam based on the proximity or distance between the transmitting UE 115 and the first UE 115.

In any case, the transmitting UE 115 may transmit an indication of the sidelink feedback configurations to the first UE 115 and the second UE 115, which may be transmitted using SCI, RRC signaling (e.g., via a PC5 RRC message), or any combination thereof. The use of beam-specific sidelink feedback configurations may enable the transmitting UE 115 to effectively receive feedback for sidelink messages sent on beams having different priority, where higher-priority beams may provide additional feedback granularity compared to lower-priority beams, thus increasing the reliability of communications between UEs 115.

The first UE 115 and second UE 115 may provide feedback to sidelink messages received over the first and second beam, respectively, in accordance with the sidelink feedback configurations. As an example, the first UE 115 may transmit ACK/NACK feedback on the first beam in accordance with the first sidelink feedback configuration, whereas the second UE 115 may transmit NACK-only feedback on the second beam in accordance with the second sidelink feedback configuration. In such cases, the resources selected for the feedback messages may be based on a beam ID corresponding to the beam on which a sidelink message was received. The selected resources may also be based on a transmitter ID and the resources in which the sidelink message was received. Further, the transmission and retransmission of sidelink messages over different beams may be based on one or more TCI states. For instance, a TCI state may indicate that an initial transmission of a sidelink message may be sent over the first beam and during some time interval (e.g., a slot), and one or more retransmission of the sidelink message may be sent on the first beam and another beam during one or more additional time intervals. In other examples, another TCI state may indicate different beams, or different time intervals in which retransmissions may be received. As such, a receiving UE 115 may know how and when retransmissions of the sidelink message may be received, thereby enhancing communications efficiency and reliability in the system.

Figure 2:
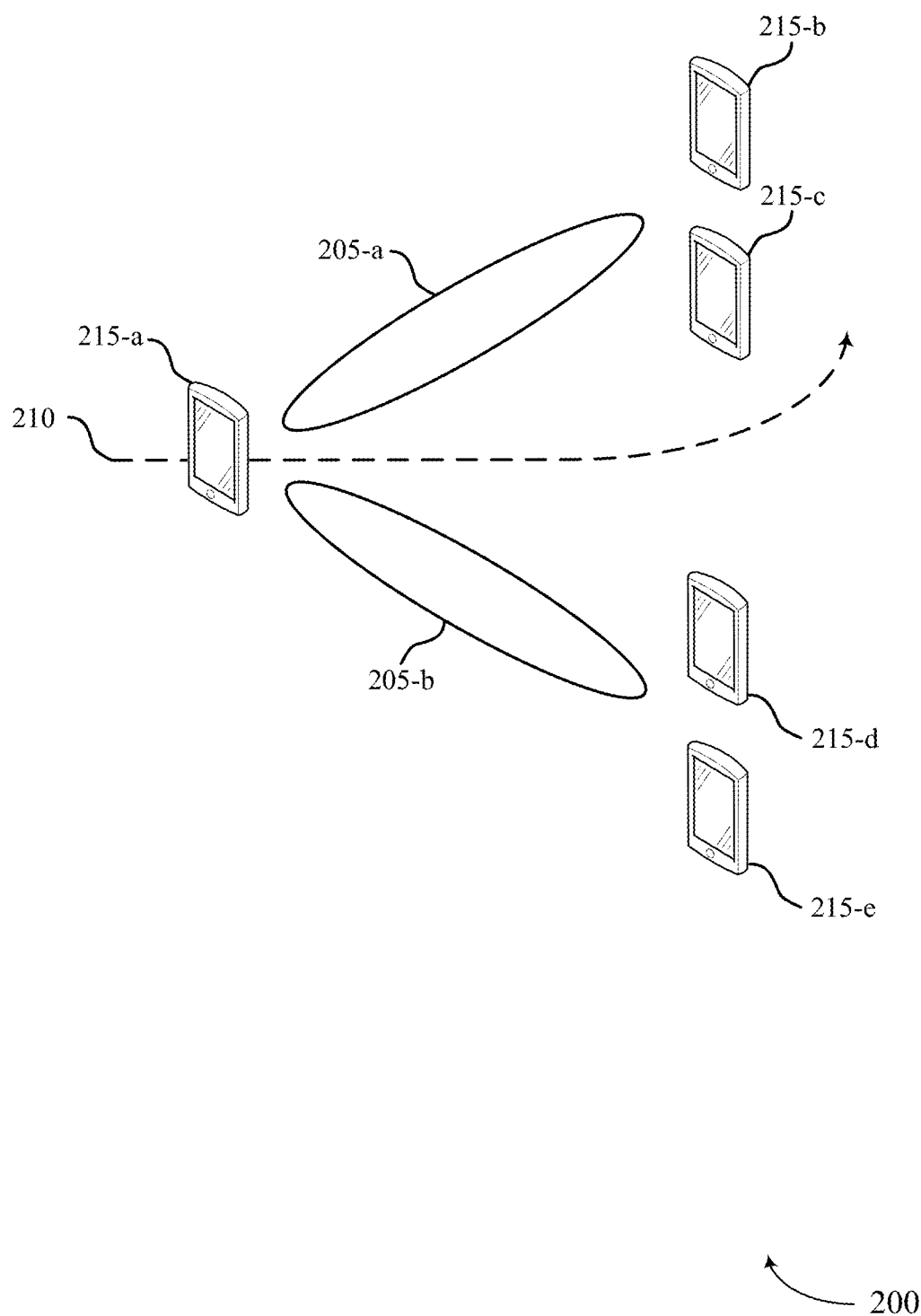
FIG. 2 illustrates an example of a wireless communications system that supports techniques for configuring beam-specific feedback for sidelink communications in accordance with various aspects of the present disclosure.

FIG. 2 illustrates an example of a wireless communications system 200 that supports techniques for configuring beam-specific feedback for sidelink communications in accordance with various aspects of the present disclosure. In some examples, wireless communications system 200 may implement aspects of wireless communications system 100. For example, wireless communications system 200 may include one or more UEs 215 (e.g., UE 215-*a*, UE 215-*b*, UE 215-*c*, UE 215-*d*, and UE 215-*e*) which may be examples of the UEs 115 as described with reference to FIG. 1. In some cases, one or more of the UEs 215 may be an example of a vehicle. Wireless communications system 200 may support the use of respective sidelink feedback configurations for different directional beams.

A UE 215 may communicate with one or more other UEs 215 via sidelink communications. Sidelink communications may be referred to as D2D communications, V2V communications, V2X communications, and the like. UE 215-*a* may be an example of a transmitting UE 215, and UE 215-*b*, UE 215-*c*, UE 215-*d*, and UE 215-*e* may each be examples of receiving UEs 215. In some examples, sidelink transmissions may be a unicast transmissions (e.g., one-to-one transmissions) or groupcast transmissions (e.g., one-to-all transmissions). For example, UE 215-*a* may transmit to UE 215-*b*, UE 215-*c*, UE 215-*d*, or UE 215-*e* individually or UE 215-*a* may broadcast a transmission to UE 215-*b*, UE 215-*b*, UE 215-*c*, UE 215-*d*, and UE 215-*e*.

In some examples, the transmitting UE 215 (e.g., UE 215-*a*) may receive feedback from one or more of the receiving UEs 215, where the feedback may be transmitted on a PSFCH. In such cases, UE 215-*a* may transmit information to UE 215-*b*, and UE 215-*b* may transmit feedback to UE 215-*a* indicating whether the transmission was successful or not (e.g., whether the transmission was successfully decoded). UE 215-*b* may transmit ACK/NACK feedback. ACK feedback may indicate that the transmission from UE 215-*a* was received at UE 215-*b* successfully, whereas NACK feedback may indicate that the transmission from UE 215-*a* was not received successfully at UE 215-*b*. In the case of NACK feedback, UE 215-*a* may determine that the original transmission was not received correctly by UE 215-*b*, and UE 215-*a* may retransmit the information to UE 215-*b*. In some examples, UE 215-*b* may be configured to transmit ACK/NACK feedback. That is, UE 215-*b* may be capable of transmitting both ACK and NACK feedback. Additionally or alternately, UE 215-*b* may be configured to transmit NACK feedback without ACK feedback.

Sidelink communications in wireless communications system 200 may be performed over one or more directional beams. For example, UE 215-*b* may transmit to UE 215-*b* using beam 205-*a* and UE 215-*a* may transmit to UE 215-*d* using beam 205-*b*. Here, one or more beams 205 may correspond to a sidelink communications link between UEs 215. For instance, beam 205-*a* (in addition to one or more other directional beams) may correspond to a sidelink communication link with UE 215-*b*, or UE 215-*c*, or both, whereas beam 205-*b* (in addition to one or more other directional beams) may correspond to another sidelink communication link with UE 215-*d*, or UE 215-*e*, or both. Messages transmitted over the beam 205-*a* and beam 205-*b* may be transmitted using a same set of resources (e.g., one or more subchannels, or PRBs, or both) or may be transmitted using different sets of resources.

In some examples, UE 215-*a* my prioritize communications associated with one directional beam over another. For example, UE 215-*a* may be moving along or predicted to move along path 210 toward UE 215-*b* and, as such, may attribute more importance to communications with UE 215-*b* as opposed to communications with UE 215-*d*. More specifically, based on the path 210 (which may take into account the motion, speed, direction, velocity, position, and the like, of UE 215-*a*, UE 215-*b*, UE 215-*c*, or any combination thereof), UE 215-*a* may approach or be near one or both of UE 215-*b* and UE 215-*c*, and there may be an increased priority in ensuring that UE 215-*b* or UE 215-*c*, or both, receive communications from UE 215-*a*. As a result, UE 215-*b* may prioritize communications using beam 205-*a* over communications using beam 205-*b*. However, UE 215-*b* and UE 215-*d* may not be aware of how to provide feedback to UE 215-*a* when different beams are associated with different priorities. Additionally, UE 215-*b* may be unable to correctly identify which beams to receive retransmissions on which may cause issues when decoding the retransmission.

When transmitting feedback to a transmitting UE 215, the receiving UE 215 may choose which resources to send feedback on based on subchannel identifier (ID) and transmitter ID. For example, UE 215-*a* may transmit to UE 215-*b* on resources located within a designated subchannel. In some examples, the resources allocated for the UEs 215 may be divided into distinct subchannels, where each subchannel includes different frequency allocations. For example, a time interval (e.g., a slot duration) may include multiple subchannels (e.g., subchannel 1, subchannel 2, subchannel 3, etc.) and each subchannel may have an associated subchannel ID, which may be preconfigured. For example, PRBs one through ten may correspond to subchannel 1, while PRBs eleven through twenty may correspond to subchannel 2, and so forth. Additionally, each transmitting UE 215 (e.g., UE 215-a) may have an associated transmitter ID. In some examples, UE 215-a may convey the subchannel ID and transmitter ID to UE 215-b prior to feedback. For example, the subchannel ID and the transmitter ID may be included in SCI or RRC messaging. After receiving the transmission from UE 215-a, UE 215-b may choose feedback resources to send feedback on based on the received subchannel ID and transmitter ID. For example, if UE 215-b receives a transmission from UE 215-a on resources located within subchannel 1, UE 215-b may choose feedback resources based on the subchannel ID associated with subchannel 1 and the transmitter ID associated with UE 215-a. In some examples, UE 215-b may choose feedback resources (e.g., within the physical sidelink feedback channel (PSFCH)), which may be located after the system wide physical sidelink shared channel (PSSCH) gap. However, a first receiving UE 215 and second receiving UE 215 may experience issues choosing resources in situations where the transmitting UE 215 concurrently transmits to the first receiving UE 215 and second receiving UE 215 on resources located within the same subchannel.

As described herein, a transmitting UE 215 (e.g., UE 215-a) may configure the receiving UEs 215 with a feedback type based on the priority given to a directional beam 205. For instance, UE 215-a may concurrently transmit to UEs 215-b and UE 215-c on beam 205-a and UEs 215-d and UE 215-e on beam 205-b using the same resources (e.g., subchannel), and UE 115-a may be moving along or predicted to move along path 210 toward UE 215-b and away from UE 215-d. In such examples, UE 215-a may attribute more importance or a greater priority to communications using beam 205-a as compared to communications using beam 205-b. That is, UE 215-a may prioritize beam 205-a over beam 205-b. As such, UE 215-a may configure different feedback options for UEs 215 communicating on different priority beams. For example, UE 215-a may configure one or more receiving UEs 215 using beam 205-a (e.g., UE 215-b, or UE 215-c, or both) with ACK/NACK feedback and configure receiving UEs 215 using beam 205-b (e.g., UE 215-d, or UE 215-e, or both) with NACK-only feedback (e.g., feedback that excludes ACK feedback). That is, the receiving UEs 215 may be aware of which feedback option to use based on the priority of the beam. The beam based feedback options may be included in SCI or RRC messaging, or any combination thereof, sent from the transmitting UE 215 to the one or more receiving UEs 215.

In accordance with aspects of the present disclosure, the receiving UEs 215 may choose which resources to send feedback on based on subchannel ID, transmitter ID, and beam ID. For example, UE 215-a may be transmitting to UEs 215-c and 215-d on beam 205-a and concurrently transmitting to UEs 215-d and 215-e on beam 205-b using the same subchannel (e.g., subchannel 1). In some cases, beam 205-a may have an associated beam ID (e.g., beam 1) and beam 205-b may have a different associated beam ID (e.g., beam 2). Additionally, in some examples, receiving UEs 215 included in a group (e.g., UEs 215-b and 215-c or UEs 215-d and 215-c) may also have a member ID. For example, UE 215-b may have an associated member ID different from UE 215-c. In some examples, UE 215-a may indicate the beam IDs to UEs 215-b, 215-c, 215-d, and 215-e, where the beam IDs may be included in SCI or RRC messaging and indicated to UEs 215-b, 215-c, 215-d, and 215-e. In other examples, the receiving UEs 215 may determine the beam IDs based on system information or signaling received on the respective directional beams 205. In some instances, the receiving UEs 215 may use the beam IDs, along with the transmitter ID and subchannel ID, to choose resources for transmitting feedback. For example, UE 215-b may choose resources based on the beam ID associated with beam 205-a, the transmitter ID associated with UE 215-a, and the subchannel ID associated with subchannel 1. Alternatively, UE 215-d may choose resources based on the beam ID associated with beam 205-b, the transmitter ID associated with UE 215-a, and the subchannel ID associated with subchannel 1. That is, the beam ID may allow UEs 215-b and 215-d to choose different resources within the feedback channel (e.g., a PSFCH HARQ region) for transmitting feedback to UE 215-a.

In some examples, the receiving UE 215 may use a TCI state dependent feedback configuration to receive a retransmission from the transmitting UE 215. For example, UE 215-b may transmit NACK feedback to UE 215-a, indicating that the transmission was not received successfully and retransmission is needed. In response, UE 215-a may retransmit the information to UE 215-b. In some examples, UE 215-b may use TCI state information to receive and decode the retransmission. TCI state information may include multiple TCI states (e.g., TCI state-1, TCI state-2) where different TCI states may indicate different beams, different time durations, or any combination thereof, for sidelink transmissions and retransmissions by UE 215-a. For example, UE 215-a may use TCI state 1, where UE 215-a transmits using beam 1 to resources at time slot n and may retransmit using beam 2 to resources at time slot m, where m>n. In some examples, UE 215-a may indicate the TCI state information to UE 215-b in RRC or SCI messaging. UE 215-b may use the TCI information to receive and decode the retransmission from UE 215-a. For example, UE 215-b may use the information included in TCI state 1 to receive the retransmission using beam 2 and use the transmission received using the beam 1 at slot n and beam 2 at slot m to decode the transmission at slot n. That is, the receiving UEs 215 may correctly identify which beams 205 to receive retransmissions on and how to decode the retransmission successfully.

Figure 3:
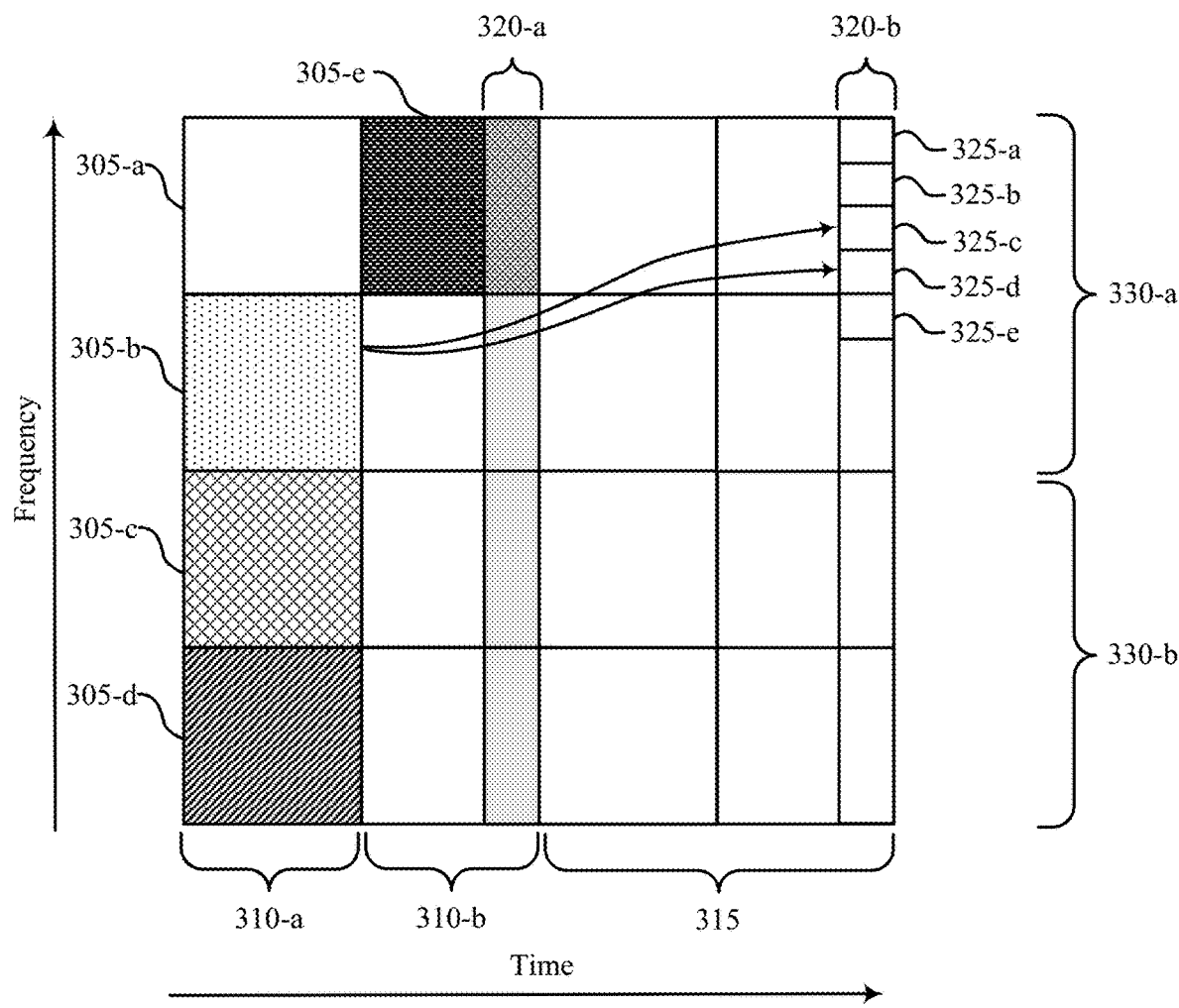
FIG. 3 illustrates an example of sidelink resources that support techniques for configuring beam-specific feedback for sidelink communications in accordance with various aspects of the present disclosure.

FIG. 3 illustrates an example of sidelink resources 300 that support techniques for configuring beam-specific feedback for sidelink communications in accordance with various aspects of the present disclosure. In some examples, the sidelink resources 300 may be utilized by one or more UEs, such as described with reference to wireless communications system 100 and wireless communications system 200. The sidelink resources 300 may illustrate the selection of different feedback resources based on a beam ID associated with a transmission of a sidelink message.

During sidelink communications, a receiving UE may transmit feedback to a transmitting UE to indicate if the information sent by the transmitting UE was received or decoded successfully. For instance, the transmitting UE may receive feedback on a PSFCH from one or more receiving UEs in the form ACK/NACK feedback or NACK-only feedback. In some examples, the transmitting UE may transmit information to the receiving UE on resources located in time interval (e.g., slot 310-a or 310-b) and, in response, the receiving UE may transmit feedback to the transmitting UE on resources located within a feedback region 320 (e.g., feedback region 320-a or a feedback region 320-b) including HARQ resources for a feedback message (s) (e.g., via PSFCH). In some examples, feedback region 320 may be repeated throughout the sidelink resources 300. For example, feedback region 320-b may be located after feedback region 320-a. In some examples, feedback region 320-a and feedback region 320-b may be separated by gap 315. Gap 315 may be an example of a system-wide physical sidelink shared channel (PSSCH) gap or a periodicity of system-wide PSFCH feedback resources configuration.

In some examples, resources allocated to the UEs for sidelink communication may be divided into multiple subchannels 305 with different frequency resource allocations. For example, slot 310-a may include subchannel 305-a, subchannel 305-b, subchannel 305-c, and subchannel 305-d. Additionally or alternatively, slot 310-b may include subchannel 305-e and other subchannels 305. In some examples, different subchannels 305 may have different locations in the frequency domain (e.g., subchannel 305-a, subchannel 305-b, subchannel 305-c, and subchannel 305-d may be adjacent to one another in the frequency domain). Additionally or alternatively, different subchannels 305 may have the same frequency allocation, but may be located in different slots 310. (e.g., subchannel 305-a and subchannel 305-e may occupy different time-domain resources). Each subchannel 305 may be associated with a subchannel ID. For example, subchannel 305-a may correspond to subchannel 1, subchannel 305-b may correspond to subchannel 2, subchannel 305-c may correspond to subchannel 3, and so forth.

In some examples, a UE receiving a sidelink message over a sidelink communication link may choose feedback resources 325 within feedback region 320-b based on a transmitter ID and subchannel ID. The feedback region 320-b may be split such that a first portion or region 330-a is reserved for feedback associated with even numbered transmitter IDs, and a second portion or region 330-b is reserved for feedback associated with odd numbered transmitter IDs. The feedback region may further include feedback resources 325 according to a corresponding subchannel ID. For example, feedback resource 325-a may correspond to subchannel 305-a, feedback resource 325-b may correspond to subchannel 305-b, feedback resource 325-c may correspond to subchannel 305-c, and so forth. As an example, based on an even numbered transmitter ID and a subchannel ID associated with subchannel 305-a, a receiving UE may transmit feedback on resource 325-a. Whereas, based on an odd numbered transmitter ID and subchannel ID associated with a subchannel 305-b, a receiving UE may transmit feedback on feedback resources within the region 330-b. In some examples, if one transmitting UE concurrently communicates with two or more receiving UEs on the same set of resources (e.g., the same subchannel 305), the receiving UEs may be unable to correctly identify unique feedback resources 325.

However, the described techniques may enable receiving UEs to select resources within the feedback region 320 based on transmitter ID, subchannel ID, and beam ID. For instance, a transmitting UE may transmit to a first receiving UE using a first directional beam and a second receiving UE using a second direction beam. Here, the first directional beam may be associated with a first beam ID (e.g., beam 1) and the second directional beam may be associated with a second beam ID different from the first beam ID (e.g., beam 2).

Accordingly, when both the receiving UEs transmit feedback to the transmitting UE for one or more sidelink messages received on a same set of resources, the selected feedback resources 325 may be differentiated for each UE based on the transmitter ID, the subchannel ID, and the beam ID. In some examples, and as described herein, the different receiving UEs may further be configured with different sidelink feedback schemes for the first and second beams. As such, the receiving UEs may be configured to transmit ACK/NACK or NACK-only feedback based on the sidelink feedback configuration received from the transmitting UE. In some aspects, the respective sidelink feedback configurations may be based on a beam priority of the directional beams.

In an example, a transmitting UE may transmit one or more sidelink messages to a first receiving UE using a first directional beam (e.g., beam 1) and also transmit one or more sidelink messages to a second receiving UE using a second directional beam (e.g., beam 2) concurrently on a same set of resources (e.g., subchannel 305-b). In response, the receiving UEs may transmit feedback based on receiving the one or more sidelink messages. Accordingly, the receiving UEs may select resources within feedback region 320-b using the beam ID, subchannel ID, and transmitter ID based on the received one or more sidelink messages. Here, the first receiving UE may obtain a beam ID associated with the first directional beam (e.g., beam 1), a transmitter ID associated with the transmitting UE, and a subchannel ID associated with subchannel 305-b. Likewise, the second receiving UE may obtain a beam ID associated with the second directional beam (e.g., beam 2), the transmitter ID associated with the transmitting UE, and the subchannel ID associated with subchannel 305-b. The different beam IDs may allow the UEs to select different feedback resources 325. For example, the first receiving UE may select feedback resource 325-c. Alternatively, the second receiving UE may select feedback resource 325-d.

Thus, the feedback resources 325 selected by one or more UEs may be chosen based on the beam ID, transmitter ID, and the subchannel 305 in which the UEs receives sidelink messages (e.g., data) from a transmitting UE. Further, within the same beam, different UE may choose different PRBs or codes, or both, to transmit feedback. For example, different UEs may select different feedback resources 325 (e.g., PRBs/codes) among the feedback resources 325 configured for a directional beam. Thus, one or more feedback resources 325 may be associated with a directional beam, which may distinguish the feedback received at a transmitting UE, and may further reduce ambiguity or complexity when a receiving UE is selecting feedback resources. Additionally, for receiving UEs using the same beam, a member ID may also be utilized, where the member ID may further distinguish feedback resources 325.

Figure 4:
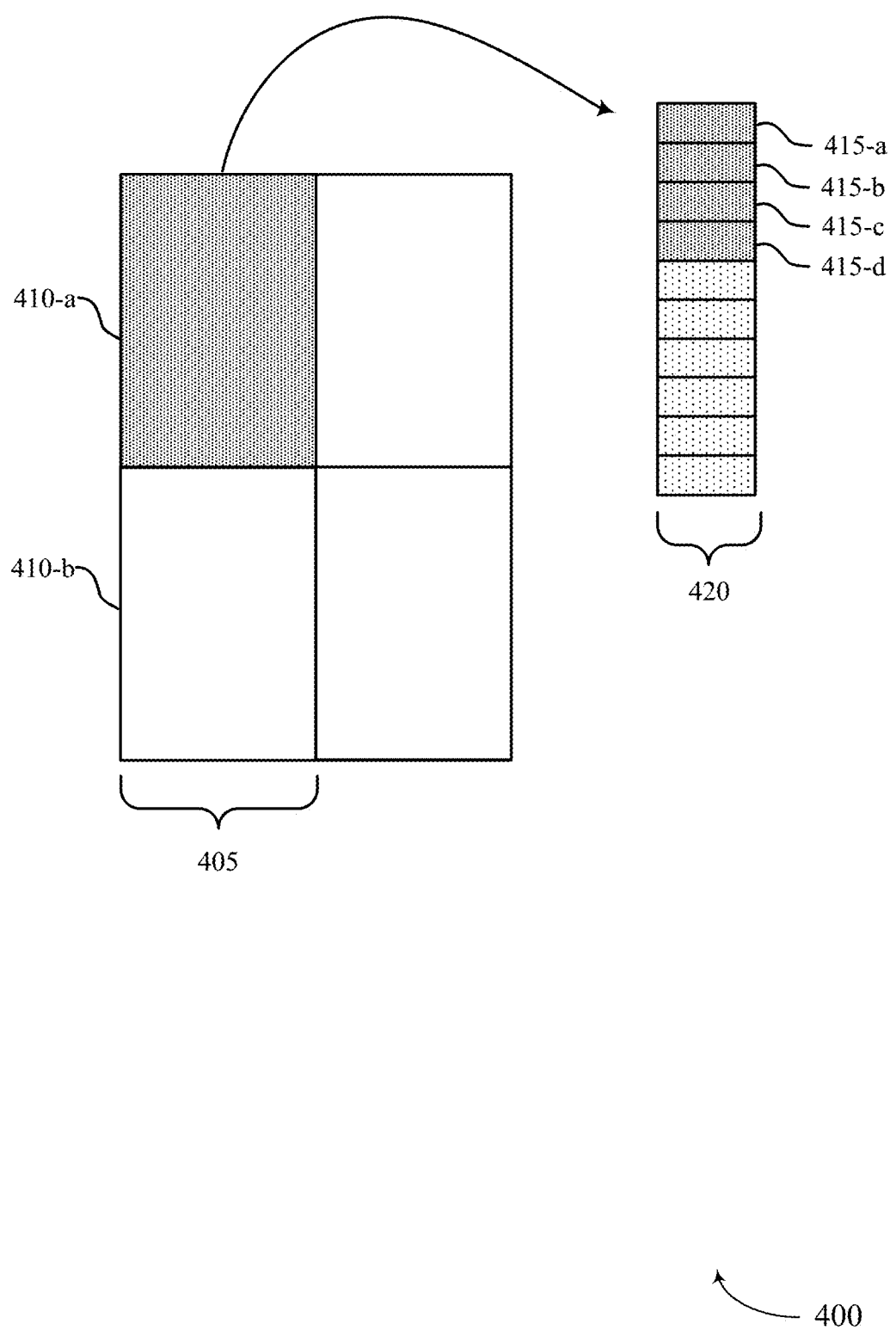
FIG. 4 illustrates an example of sidelink resources that support techniques for configuring beam-specific feedback for sidelink communications in accordance with various aspects of the present disclosure.

FIG. 4 illustrates an example of sidelink resources 400 that support techniques for configuring beam-specific feedback for sidelink communications in accordance with various aspects of the present disclosure. In some examples, the sidelink resources 400 may be utilized by one or more UEs, such as described with regard to wireless communications system 100 or wireless communications system 200. The sidelink resources 400 may illustrate various aspects of a beam-specific PSFCH configuration, where resources (e.g., PRBs) may be configured for feedback based at least in part on a number of UEs and a number of beams. In some cases, the sidelink resources 400 may include one or more time intervals (e.g., slots 405) in the time domain and one or more subchannels 410 (e.g., subchannel 410-a and subchannel 410-b) in the frequency domain.

Sidelink resources 400 used by a transmitting UE may be allocated into different subchannels 410, where each subchannel 410 may have a subchannel ID. In some examples, a time interval (e.g., slot 405) may include multiple subchannels 410 (e.g., subchannel 410-a and subchannel 410-b). In some examples, each subchannel 410 may correspond to a set of resources (e.g., PRBs 415) within the feedback region 420. For example, subchannel 410 may be assigned PRBs 415. A feedback region 420 for sidelink communications may be configured such that receiving UEs may select feedback resources within the feedback region 420 using beam IDs, transmitter IDs, and subchannel IDs, and the selected feedback resources may be used for transmitting beam-specific feedback to the transmitting UE.

A number of PRBs 415 may be configured for each subchannel 410 where, for example, each subchannel 410 in a slot 405 may be mapped to a set of PRBs 415. In some examples, the number of PRBs 415 may be configured to include four PRBs 415 (e.g., PRB 415-a, PRB 415-b, PRB 415-c, and PRB 415-d) for a subchannel 410. In such cases, the four PRBs 415 may support two UEs and ACK/NACK feedback for each UE (e.g., one resource/PRB 415 for ACK feedback and one resource/PRB 415 for NACK feedback) for each subchannel 410. In some examples, the PRBs 415 for feedback may be selected based on a transmitter ID. For example, PRB 415-b and PRB 415-b may be associated with a first transmitter ID and PRB 415-c and 415-d may be associated with a second transmitter ID. As discussed above, if two or more receiving UEs receive a sidelink message from a single transmitting UE (e.g., same transmitter ID) on a same set of resources within subchannel 410-a, the receiving UEs may identify resources (e.g., PRB 415-a, PRB 415-b, PRB 415-c, and PRB 415-d) within the set allocated to subchannel 410-a to transmit feedback based on a beam ID.

In addition, to support the beam-based feedback techniques described herein, the PRBs 415 allocated to each subchannel 410 may be configured based on a number of UEs and a number of directional beams. For example, a total number of PRBs 415 allocated to each subchannel 410 may be based on a number of UEs (e.g., a number of distinct transmitters) and a number of directional beams. Here, the number of PRBs 415 allocated to each subchannel 410 may be represented by the variable Z, the number of users may be represented by the variable Y, and the number of directional beams may be represented by the variable M.

In an example, the number of PRBs allocated to a subchannel may be four PRBs (e.g., Z=4). Further, a transmitting UE may transmit a sidelink message to a first receiving UE using a first beam and also transmit to a second receiving UE using a second beam on the same resources within subchannel 410-a. In this case, for example, Y=1 and M=2, based on the single transmitting UE and two receiving UEs. The total number of PRBs the receiving UEs may have available to select from (i.e., for sending feedback to the transmitting UE) may be represented by Z*M*Y. Thus, the first receiving UE and the second receiving UE may select from eight PRBs to utilize for sidelink feedback resources. In some examples, four PRB may be reserved for a first beam (e.g., first beam ID) and four PRBs may be reserved for a second beam, where each beam may support two users and ACK/NACK feedback for the two users. In some cases, the set of PRBs 415 allocated to each subchannel 410 may be increased to support more users. Further, each PRB 415 may have M*Y available pairs of cyclic shifts, where a pair of cyclic shifts includes a first cyclic shift value for ACK and a second cyclic shift value for NACK.

In some cases, there may be different feedback rules or configurations for different transmission modes (e.g., groupcast or unicast), and the way in which the PRBs 415 are indexed may depend on the transmission mode. For instance, for a unicast transmission, a resource index (e.g., a PSFCH resource index) may be based on a transmitter ID, which may be derived using, for example, $TxID_{L1-source} \bmod (Z*M*Y)$. In other examples, such as in the case of a groupcast transmission, the resource index may be based on the transmitter ID and similarly derived in accordance with $TxID_{L1-source} \bmod(Z*M*Y)$, where a cyclic shift value for ACK may not be used. Additionally or alternatively, in the case of a groupcast transmission, the resource index may be based on the transmitter ID and the member ID of a receiving UE in the group, which may be derived using, for example, $(TxID_{L1-source}+T) \bmod (Z*M*Y)$, where T is the member ID of the receiver in the group. Thus, the receiving UEs may be configured to select PRBs 415 for transmitting feedback based on various indexing schemes and feedback modes, which may enable the UEs to identify which feedback resources to use when sending feedback on a sidelink communication link.

Figure 5:
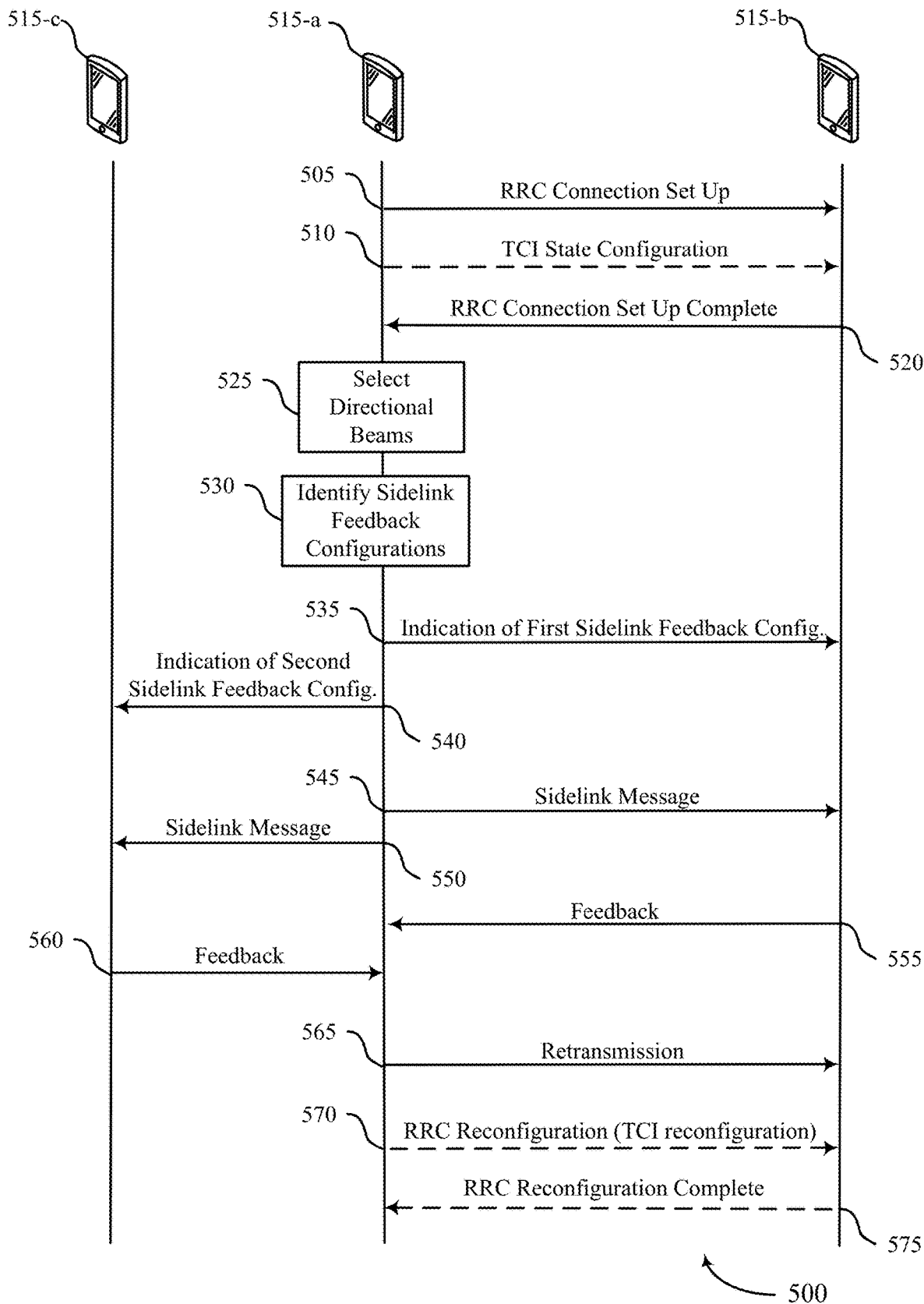
FIG. 5 illustrates an example of a process flow in a system that supports techniques for configuring beam-specific feedback for sidelink communications in accordance with various aspects of the present disclosure.

FIG. 5 illustrates an example of a process flow 500 in a system that supports techniques for configuring beam-specific feedback for sidelink communications in accordance with various aspects of the present disclosure. In some examples, the process flow 500 may implement aspects of wireless communications system 100. Process flow 500 includes UE 515-a, UE 515-b, and UE 515-c, which may be examples of the corresponding devices described with reference to figures FIGS. 1 and 2. The process flow 500 may illustrate an example of beam-specific sidelink feedback configurations. In addition, the process flow 500 may illustrate the configuration of different TCI states that may be used for identifying how sidelink messages may be transmitted and retransmitted.

UE 515-a may be an example of a transmitting UE, and UE 515-b and 515-c may be examples of receiving UEs. In some examples, UE 515-a may transmit to UE 515-b and UE 515-c concurrently via two different direction beams on the same resource. For example, UE 515-a may transmit to UE 515-b via a first directional beam and transmit to UE 515-c via a second directional beam. In some cases, UE 515-a may prioritize communication over a particular beam. That is, 515-b may prioritize a type of feedback associated with a particular beam. If UE 515-a is moving toward or predicted to move toward UE 515-b and away from UE 515-c, UE 515-a may configure ACK/NACK feedback associated with the first beam and NACK-only feedback associated with the second beam. Additionally or alternatively, UE 515-a may indicate a beam ID associated with the first beam and the second beam to UE 515-b and 515-c, respectively and UE 515-b and 515-c may use the beam ID, along with a transmitter ID and a subchannel ID, to select feedback resources. Additionally, in the case of NACK feedback, UE 515-a may retransmit to UE 515-b and UE 515-c. In such cases, UE 515-b and UE 515-c may use TCI information to receive the retransmission and decode the retransmission.

UE 515-a may establish a connection with UE 515-b and UE 515-c. For instance, in the example of UE 515-a and UE 515-b, at 505, UE 515-a may send an RRC connection set up message to UE 515-b. In addition, UE 515-a may provide an indication of a set of one or more TCI states that may be used for sidelink communications between UE 515-*a* and UE 515-*b*. For example, at 510, UE 515-*a* may transmit, and UE 515-*b* may receive a TCI state configuration for one or more sidelink communication links. The TCI state configuration may include all possible TCI state configurations (e.g., TCI state 1, TCI state 2) available for communications between UE 515-*a* and UE 515-*b*. Each TCI state may indicate different beams, different time intervals, or any combination thereof, for sidelink transmissions and retransmission. In such cases, one TCI state may indicate which directional beam may be used for an initial transmission of a sidelink message and which beam will be used for retransmission of the sidelink message. As such, UE 515-*b* may use the TCI state configuration to receive and decode one or more sidelink messages transmitted by UE 515-*a*. In some cases, the TCI state configuration may be signaled via SCI or via RRC messaging.

At 520, UE 515-*b* may send an RRC connection set up complete message to UE 515-*a*. At 525, UE 515-*a* may select one or more directional beams for communicating with UE 515-*b* and UE 515-*c*. For example, UE 515-*a* may select a first directional beam for communicating with UE 515-*b* over a first sidelink communication link. Likewise, UE 515-*a* may select a second directional beam for communicating with UE 515-*c* over a second sidelink communication link.

At 530, UE 515-*a* may identify beam-specific sidelink feedback configurations based on the selected directional beams. For example, UE 515-*a* may configure UE 515-*b* and 515-*c* with different feedback schemes (e.g., ACK/NACK or NACK only) based on the selected directional beams. In some instances, UE 515-*a* may be moving toward UE 515-*b* and away from UE 515-*c* and thus, UE 515-*a* may prioritize communications with UE 515-*b* over communications with UE 515-*c* (e.g., based on the direction of motion of UE 515-*a*). As such, UE 515-*a* may configure ACK/NACK feedback for UE 515-*b* using the first directional beam and configure NACK feedback for UEs using a second beam. Additionally, each of the selected directional beams may be associated with a respective beam ID, which may be used for selecting feedback resources by one or both of UE 515-*b* and UE 515-*c*.

At 535, a first sidelink feedback configuration may be indicated to UE 515-*b* via SCI or via RRC messaging. In some examples, the indication of beam based feedback may be periodic (e.g., once per N slots) or dynamically indicated, for example, based on the direction that UE 515-*a* is moving, or based on other conditions or parameters. Likewise, at 540, a second sidelink feedback configuration, different from the first sidelink feedback configuration, may be indicated to UE 515-*b* via SCI or via RRC messaging.

At 545 and 550, UE 515-*a* may transmit one or more sidelink messages over the sidelink communications links to UE 515-*b* and UE 515-*c* using the first directional beam and the second directional beam, respectively. In some examples, the transmission of the sidelink messages may be a unicast transmission or a groupcast transmission. In some cases, the sidelink message may be transmitted on the selected directional beams, and the transmissions may be based on one or more TCI states used for the transmission of the sidelink messages. In some examples, the TCI state may be indicated by UE 515-*a*, to UE 515-*b* and UE 515-*c*, using SCI or RRC signaling (e.g., PC5 RRC signaling).

At 555, UE 515-*b* may transmit, and UE 515-*a* may receive, feedback based on the sidelink message(s) from UE 515-*a*. The feedback information provided by UE 515-*b* may be in accordance with the first sidelink feedback configuration indicated by UE 515-*a*, which may include ACK feedback, or NACK feedback, or both. Additionally, at 560, UE 515-*c* may transmit feedback to UE 515-*a* based on the sidelink messages transmitted at 550. In such cases, UE 515-*c* may be configured for NACK-only feedback based on the second sidelink feedback configuration. In some examples, UE 515-*b* and UE 515-*c* may select feedback resources based on beam ID, transmitter ID, and subchannel ID. That is, the feedback resources used for the feedback messages sent at 555 and/or 560 may be based on a beam ID of the beam used to receive the sidelink message(s) (e.g., at 545 and/or 550). The feedback resources may also be based on the transmitter ID of UE 515-*a* and a subchannel ID used for transmitting the sidelink message(s).

At 565, UE 515-*a* may retransmit one or more of the sidelink messages to UE 515-*b* based on the received feedback. For instance, if UE 515-*b* included NACK feedback to UE 515-*a*, UE 515-*a* may retransmit the sidelink message(s) that UE 515-*b* was unable to decode. As described herein, UE 515-*b* may utilize TCI state information to successfully retrieve and decode the transmission. That is, the TCI state information provided by the TCI state configuration may indicate the receive beam or receive beams to receive the retransmission (as well as information regarding the initial transmission which may aid in decoding the retransmission).

In an example, UE 515-*b* may receive a transmission of a sidelink message from UE 515-*a* using a first beam (e.g., beam 1). The TCI state associated with beam 1 (e.g., TCI state-1) may indicate that another directional beam (e.g., beam 2) may be used for the retransmission of the sidelink message. Further, in the case of TCI state-1, UE 515-*a* may transmit using beam 1 in resources at time slot n and may retransmit using beam 1 and beam 2 in resources at time slot m, where m>n. Here, UE 515-*b* may use the information included in TCI state 1 to receive the transmission received using beam 1 at slot n and beam 2 at slot m to decode the initial transmission sent at slot n. In other examples, a second TCI state (e.g., TCI state-2) may indicate that if UE 515-*a* transmits the sidelink message using beam 1 in slot n, UE 515-*a* may perform retransmission of the sidelink message in beam 1 and another directional beam (e.g., beam 3) at slot k, where k>n, k≠m. Here, UE 515-*b* may transmit NACK (e.g., at 555) in slot n, and UE 515-*a* may retransmit the sidelink message in a strongest receive beam of UE 515-*b* in slot k in accordance with TCI state-2. UE 515-*b* may then use the received transmissions to decode the sidelink message. In any case, different TCI states may be mapped to one or more different combinations time intervals and beams used for transmissions, retransmissions, or both. Thus, one or more different mappings of TCI states for identifying how and when transmissions and retransmissions may be sent may be configured for different UEs (e.g., using the TCI state configuration at 510).

At 570, UE 515-*a* may transmit an RRC reconfiguration message. The RRC reconfiguration message may include a new set of TCI state configurations. That is, UE 515-*a* may update or modify the TCI state configuration via the RRC reconfiguration message send to UE 515-*b*. At 550, UE 515-*b* may transmit an RRC reconfiguration complete message to UE 515-*a* which may acknowledge the RRC reconfiguration and the updated or modified TCI states used for sidelink transmissions and retransmissions.

Figure 6:
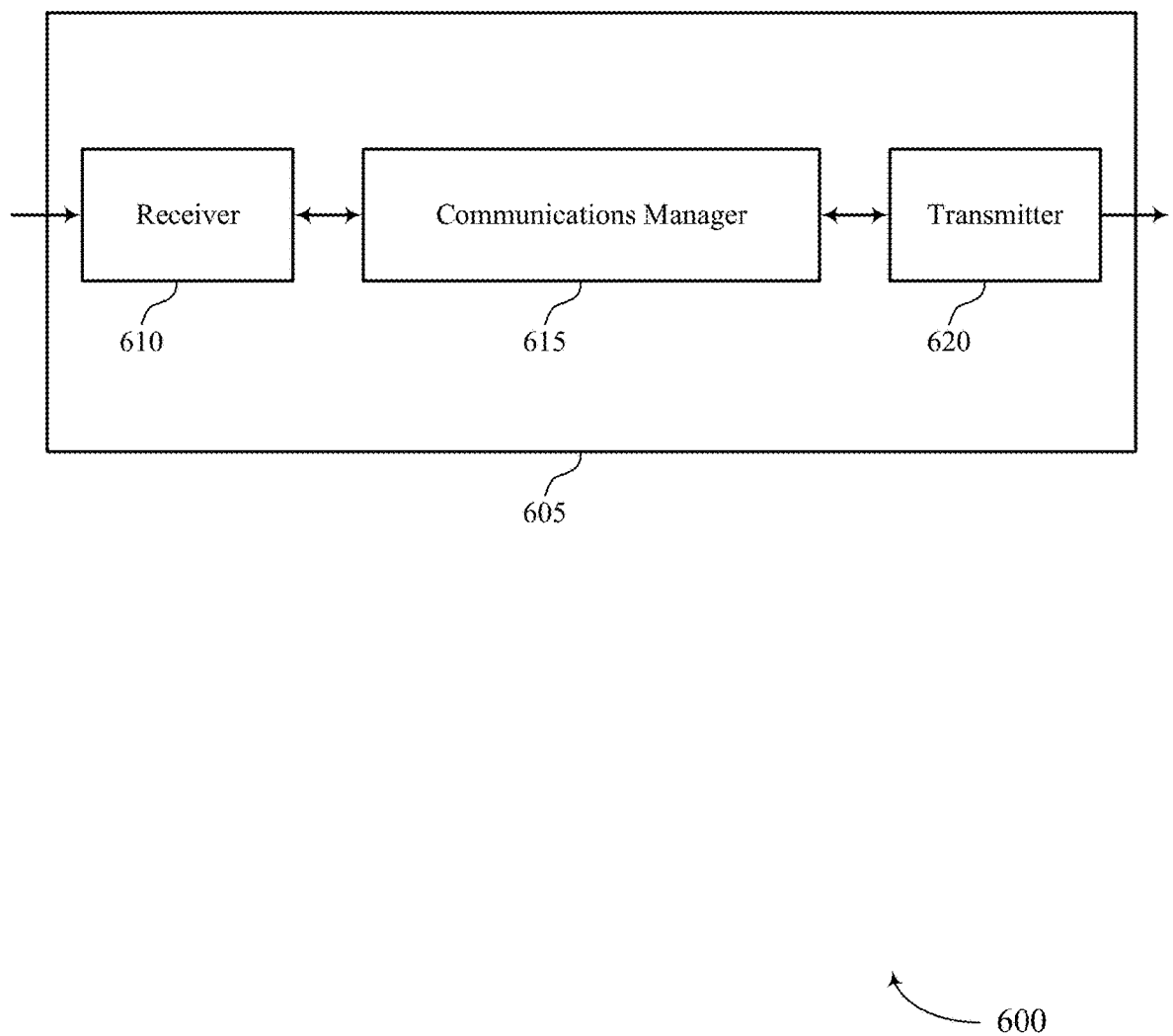
FIGS. 6 and 7 show block diagrams of devices that support techniques for configuring beam-specific feedback for sidelink communications in accordance with various aspects of the present disclosure.

FIG. 6 shows a block diagram 600 of a device 605 that supports techniques for configuring beam-specific feedback for sidelink communications in accordance with various aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for configuring beam-specific feedback for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may select a first directional beam and a second directional beam for communicating with one or more UEs over a first sidelink communication link associated with the first directional beam and a second sidelink communication link associated with the second directional beam, identify a first sidelink feedback configuration for the first directional beam and a second sidelink feedback configuration for the second directional beam, the second sidelink feedback configuration being different than the first sidelink feedback configuration, and transmit, to the one or more UEs, an indication of the identified first sidelink feedback configuration and the second sidelink feedback configuration.

The communications manager 615 may also receive, from a second UE, an indication of a sidelink feedback configuration for a first directional beam associated with a sidelink communication link, determine, based on the sidelink feedback configuration, feedback for a sidelink message received from the second UE over the first directional beam, transmit, to the second UE, the feedback message including the determined feedback, the feedback message transmitted on the selected first set of resources in response to the sidelink message, and select a first set of resources for a feedback message based on a beam identifier of the first directional beam, an identifier of the second UE, and a second set of resources for the sidelink message. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
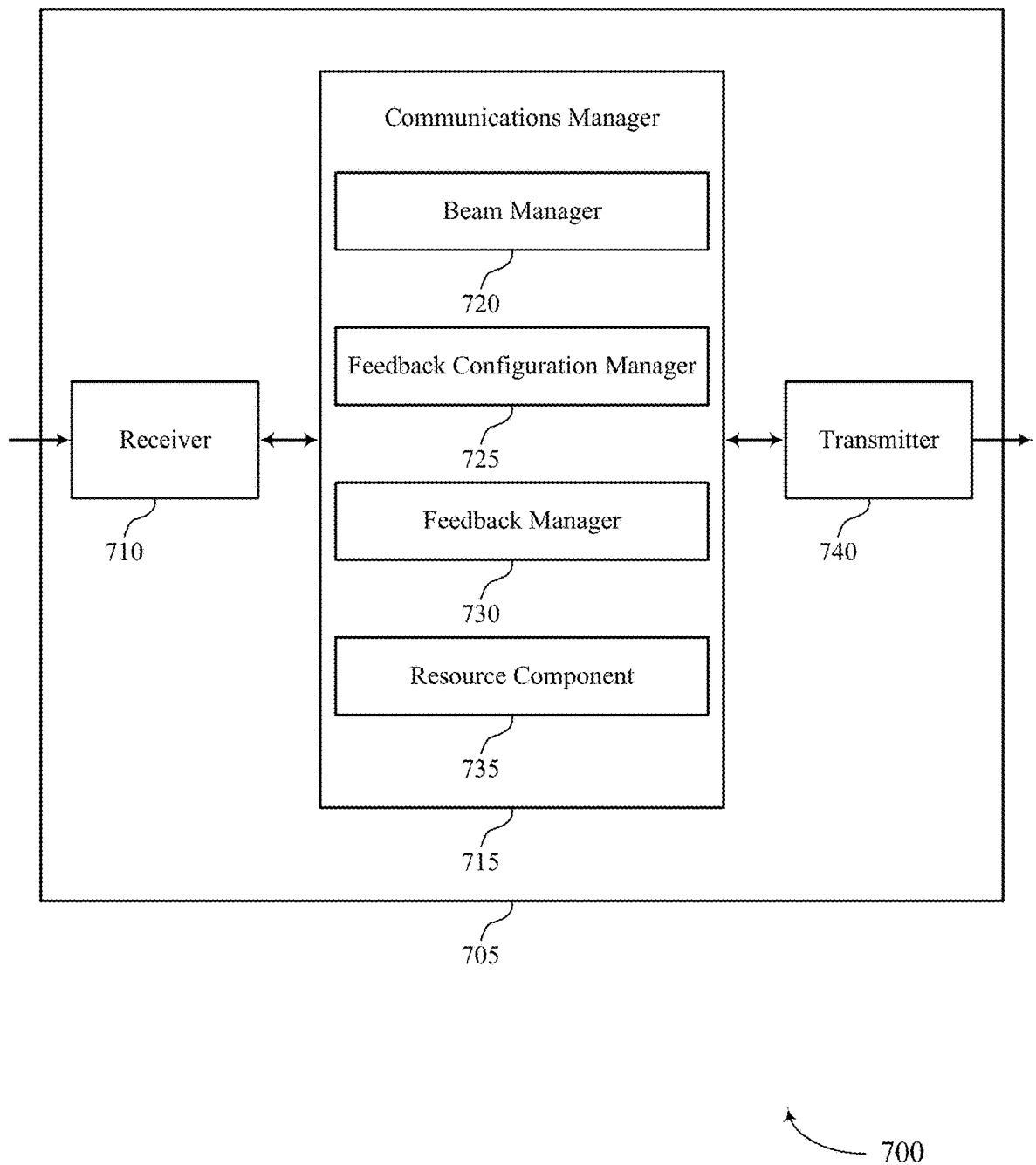

FIG. 7 shows a block diagram 700 of a device 705 that supports techniques for configuring beam-specific feedback for sidelink communications in accordance with various aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to techniques for configuring beam-specific feedback for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a beam manager 720, a feedback configuration manager 725, a feedback manager 730, and a resource component 735. The communications manager 715 may be an example of aspects of the communications manager 910 described herein.

The beam manager 720 may select a first directional beam and a second directional beam for communicating with one or more UEs over a first sidelink communication link associated with the first directional beam and a second sidelink communication link associated with the second directional beam.

The feedback configuration manager 725 may identify a first sidelink feedback configuration for the first directional beam and a second sidelink feedback configuration for the second directional beam, the second sidelink feedback configuration being different than the first sidelink feedback configuration and transmit, to the one or more UEs, an indication of the identified first sidelink feedback configuration and the second sidelink feedback configuration.

The feedback configuration manager 725 may receive, from a second UE, an indication of a sidelink feedback configuration for a first directional beam associated with a sidelink communication link.

The feedback manager 730 may determine, based on the sidelink feedback configuration, feedback for a sidelink message received from the second UE over the first directional beam and transmit, to the second UE, the feedback message including the determined feedback, the feedback message transmitted on the selected first set of resources in response to the sidelink message.

The resource component 735 may select a first set of resources for a feedback message based on a beam identifier of the first directional beam, an identifier of the second UE, and a second set of resources for the sidelink message.

The transmitter 740 may transmit signals generated by other components of the device 705. In some examples, the transmitter 740 may be collocated with a receiver 710 in a transceiver component. For example, the transmitter 740 may be an example of aspects of the transceiver 920 described with reference to FIG. 9. The transmitter 740 may utilize a single antenna or a set of antennas.

Figure 8:
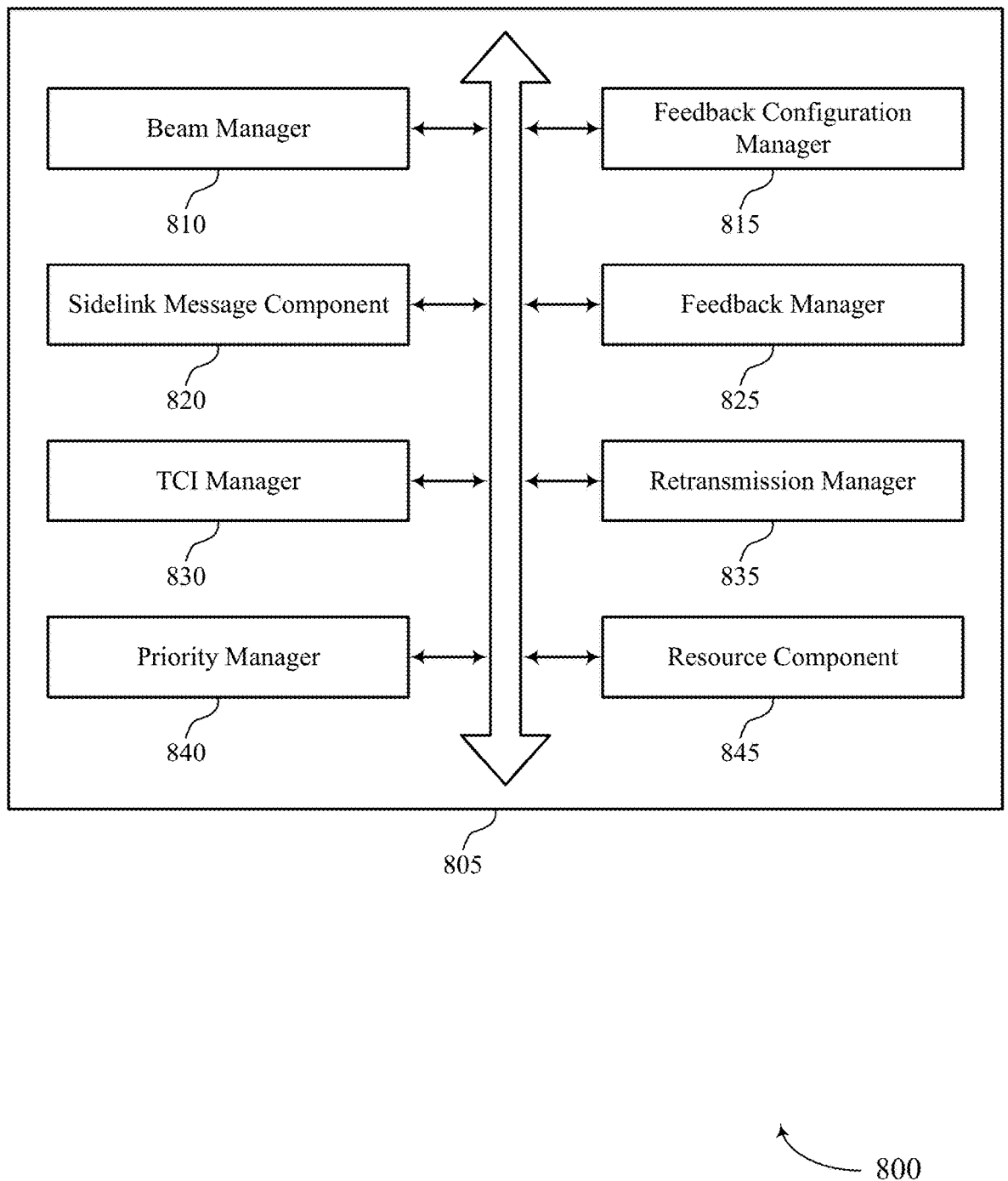
FIG. 8 shows a block diagram of a communications manager that supports techniques for configuring beam-specific feedback for sidelink communications in accordance with various aspects of the present disclosure.

FIG. 8 shows a block diagram 800 of a communications manager 805 that supports techniques for configuring beam-specific feedback for sidelink communications in accordance with various aspects of the present disclosure. The communications manager 805 may be an example of aspects of a communications manager 615, a communications manager 715, or a communications manager 910 described herein. The communications manager 805 may include a beam manager 810, a feedback configuration manager 815, a sidelink message component 820, a feedback manager 825, a TCI manager 830, a retransmission manager 835, a priority manager 840, and a resource component 845. Each of these components may communicate, directly or indirectly, with one another (e.g., via one or more buses).

The beam manager 810 may select a first directional beam and a second directional beam for communicating with one or more UEs over a first sidelink communication link associated with the first directional beam and a second sidelink communication link associated with the second directional beam.

In some examples, the beam manager 810 may identify, based on the identified transmit control indicator state, one or more additional directional beams and one or more time periods for receiving one or more retransmissions of the sidelink message.

In some cases, the first directional beam and the second directional beam are associated with a same set of physical resource blocks, a same set of subchannels, or a combination thereof.

The feedback configuration manager 815 may identify a first sidelink feedback configuration for the first directional beam and a second sidelink feedback configuration for the second directional beam, the second sidelink feedback configuration being different than the first sidelink feedback configuration.

In some examples, the feedback configuration manager 815 may transmit, to the one or more UEs, an indication of the identified first sidelink feedback configuration and the second sidelink feedback configuration. In some examples, the feedback configuration manager 815 may receive, from a second UE, an indication of a sidelink feedback configuration for a first directional beam associated with a sidelink communication link.

In some examples, the feedback configuration manager 815 may transmit SCI that indicates one or both of the identified first sidelink feedback configuration or the second sidelink feedback configuration. In some examples, the feedback configuration manager 815 may transmit, to the one or more UEs, RRC signaling that indicates one or both of the identified first sidelink feedback configuration or the second sidelink feedback configuration.

In some examples, the feedback configuration manager 815 may transmit the indication periodically, or dynamically, or any combination thereof, where the transmitted indication is based on a location of the one or more UEs, or a movement direction of the UE, or any combination thereof. In some examples, the feedback configuration manager 815 may receive SCI that indicates the sidelink feedback configuration.

In some examples, the feedback configuration manager 815 may receive RRC signaling that indicates the sidelink feedback configuration. In some cases, the sidelink feedback configuration for the first directional beam is based on a priority of the first directional beam, where the priority is based on a location of the first UE, or a movement direction of the second UE, or any combination thereof.

The feedback manager 825 may determine, based on the sidelink feedback configuration, feedback for a sidelink message received from the second UE over the first directional beam. In some examples, the feedback manager 825 may transmit, to the second UE, the feedback message including the determined feedback, the feedback message transmitted on the selected first set of resources in response to the sidelink message.

In some examples, the feedback manager 825 may receive, from the first UE, a first feedback message for the first sidelink message, the first feedback message including acknowledgement feedback or negative acknowledgment feedback in accordance with the first sidelink feedback configuration. In some examples, the feedback manager 825 may receive, from the second UE, a second feedback message for the second sidelink message, the second feedback message including negative acknowledgment feedback and excluding acknowledgment feedback in accordance with the second sidelink feedback configuration.

In some cases, the first feedback message is received on a first set of resources that correspond to a beam identifier of the first directional beam, an identifier of the first UE, and a second set of resources used for transmitting the first sidelink message. In some cases, the determined feedback includes acknowledgment feedback or negative acknowledgment feedback for the sidelink message in accordance with the sidelink feedback configuration for the first directional beam. In some cases, the determined feedback includes negative acknowledgment feedback and excludes acknowledgment feedback for the sidelink message in accordance with the sidelink feedback configuration for the first directional beam.

The resource component 845 may select a first set of resources for a feedback message based on a beam identifier of the first directional beam, an identifier of the second UE, and a second set of resources for the sidelink message. In some examples, the resource component 845 may select a set of resource blocks, or codes, or a combination thereof, for transmitting the determined feedback based on the beam identifier of the first directional beam, the identifier of the second UE, and the second set of resources for the sidelink message.

The sidelink message component 820 may transmit, to a first UE of the one or more UEs, a first sidelink message over the first directional beam. In some examples, the sidelink message component 820 may transmit a second sidelink message to a second UE of the one or more UEs over the second directional beam.

The TCI manager 830 may identify, based on a transmit control indicator state, one or more additional directional beams and one or more time periods for retransmitting the first sidelink message in response to the first feedback message. In some examples, the TCI manager 830 may transmit, to the first UE, an indication of the transmit control indicator state using SCI, or RRC signaling, or any combination thereof.

In some examples, the TCI manager 830 may identify the transmit control indicator state from a set of transmit control indicator states. In some examples, the TCI manager 830 may identify a transmit control indicator state associated with the one or more sidelink messages. In some examples, the TCI manager 830 may receive an indication of the transmit control indicator state via SCI, or RRC signaling, or any combination thereof. In some cases, the identified transmit control indicator state is from a set of transmit control indicator states.

The retransmission manager 835 may retransmit, to the first UE, at least a portion of the first sidelink message using the identified one or more additional directional beams and during the identified one or more time periods. In some examples, the retransmission manager 835 may receive, on a second directional beam from the one or more additional directional beams, a retransmission of at least a portion of the sidelink message in response to the feedback message. In some cases, the sidelink message is received within a first time period, and where the retransmission is received within the one or more time periods based on the identified transmit control indicator state, the one or more time periods being subsequent to the first time period.

The priority manager 840 may determine a first priority for the first directional beam and a second priority for the second directional beam, the second priority being different than the first priority, where identifying the first sidelink feedback configuration for the first directional beam is based on the first priority, and where identifying the second sidelink feedback configuration for the second directional beam is based on the second priority. In some cases, the first priority and the second priority are based on a location of the one or more UEs, or a movement direction of the UE, or any combination thereof.

Figure 9:
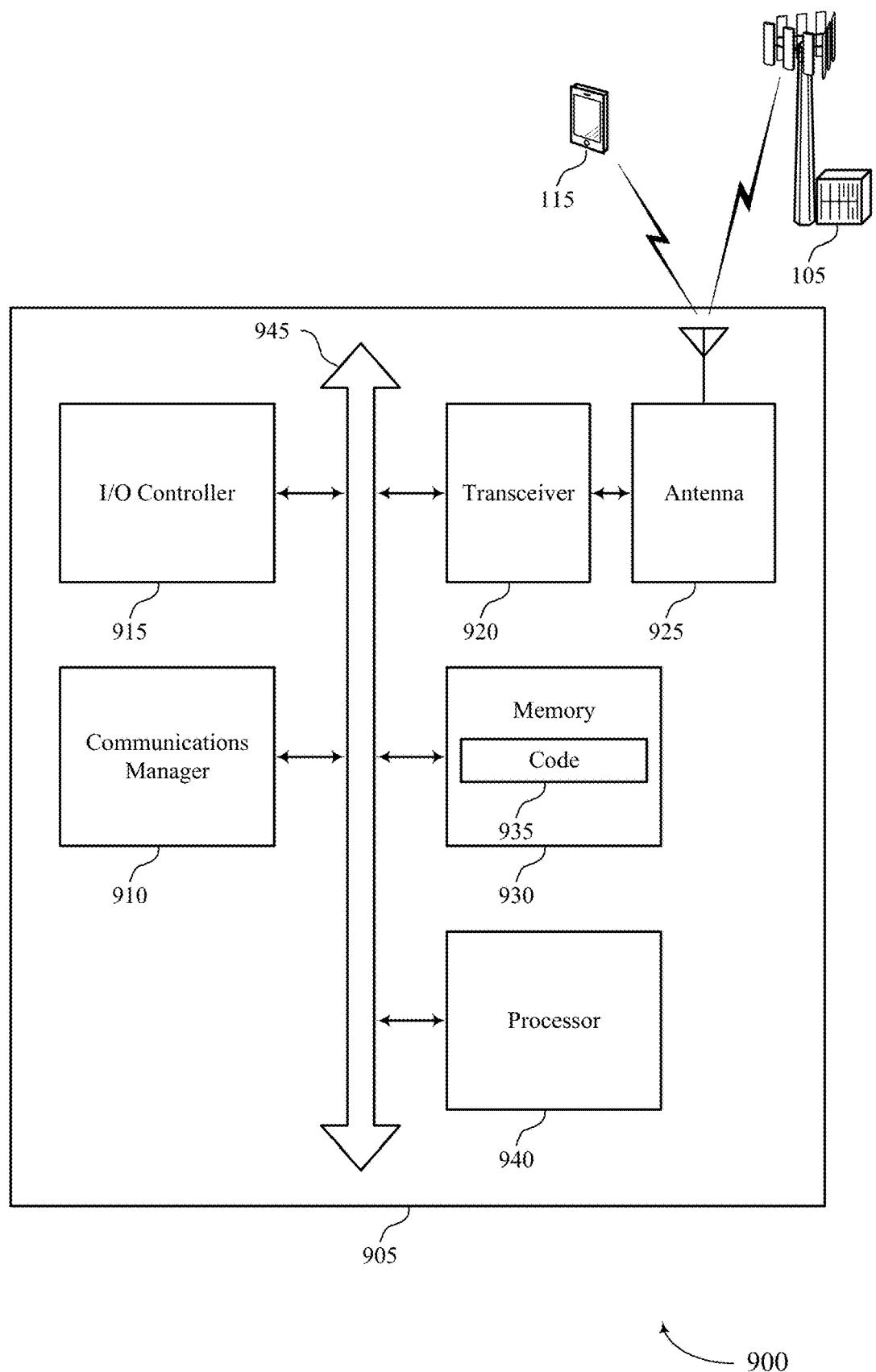
FIG. 9 shows a diagram of a system including a device that supports techniques for configuring beam-specific feedback for sidelink communications in accordance with various aspects of the present disclosure.

FIG. 9 shows a diagram of a system 900 including a device 905 that supports techniques for configuring beam-specific feedback for sidelink communications in accordance with various aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may select a first directional beam and a second directional beam for communicating with one or more UEs over a first sidelink communication link associated with the first directional beam and a second sidelink communication link associated with the second directional beam, identify a first sidelink feedback configuration for the first directional beam and a second sidelink feedback configuration for the second directional beam, the second sidelink feedback configuration being different than the first sidelink feedback configuration, and transmit, to the one or more UEs, an indication of the identified first sidelink feedback configuration and the second sidelink feedback configuration. The communications manager 910 may also receive, from a second UE, an indication of a sidelink feedback configuration for a first directional beam associated with a sidelink communication link, determine, based on the sidelink feedback configuration, feedback for a sidelink message received from the second UE over the first directional beam, transmit, to the second UE, the feedback message including the determined feedback, the feedback message transmitted on the selected first set of resources in response to the sidelink message, and select a first set of resources for a feedback message based on a beam identifier of the first directional beam, an identifier of the second UE, and a second set of resources for the sidelink message.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for configuring beam-specific feedback for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
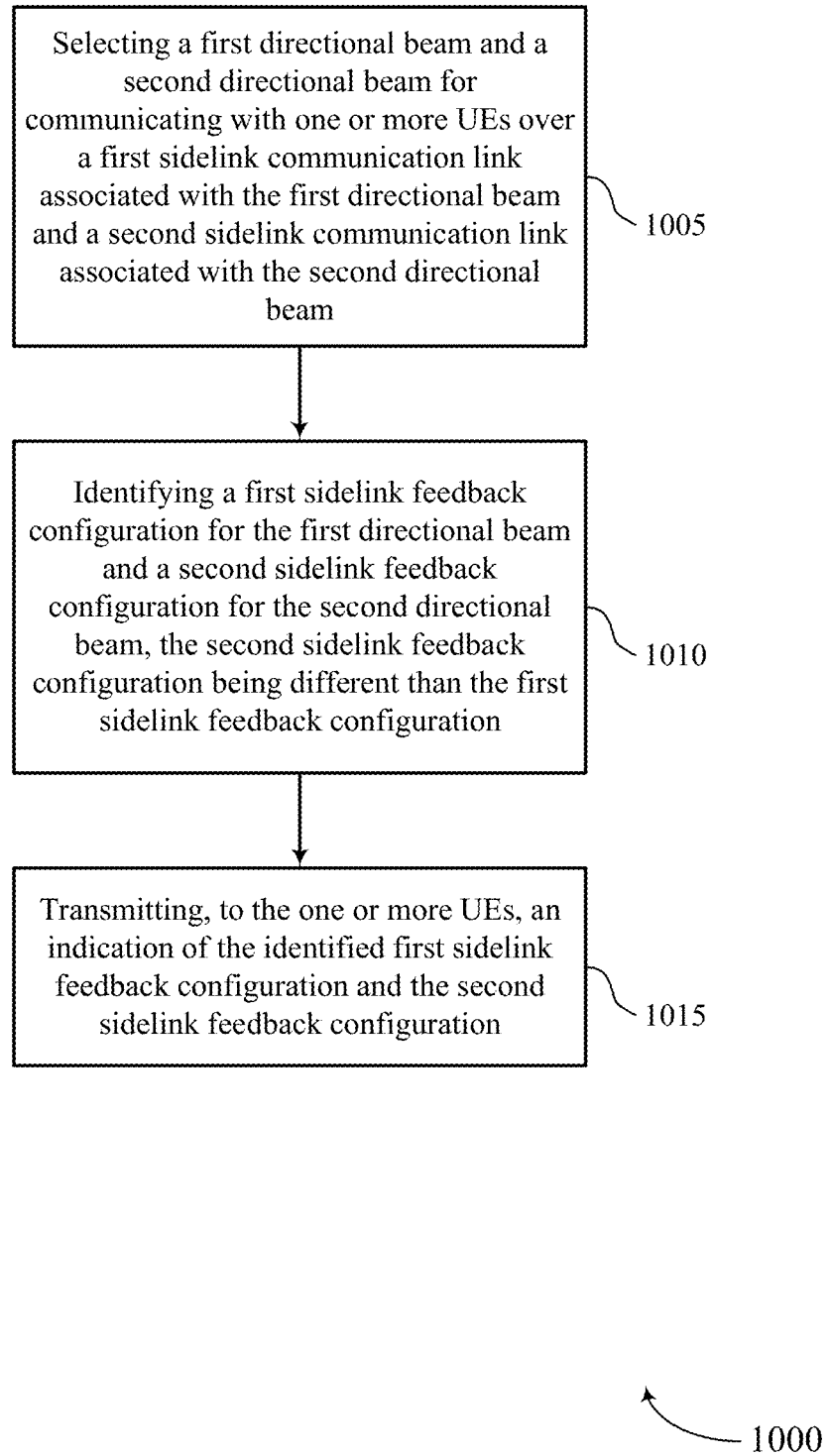
FIGS. 10 through 14 show flowcharts illustrating methods that support techniques for configuring beam-specific feedback for sidelink communications in accordance with various aspects of the present disclosure.

FIG. 10 shows a flowchart illustrating a method 1000 that supports techniques for configuring beam-specific feedback for sidelink communications in accordance with various aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may select a first directional beam and a second directional beam for communicating with one or more UEs over a first sidelink communication link associated with the first directional beam and a second sidelink communication link associated with the second directional beam. The operations of 1005 may be performed according to the methods described herein. In some examples, aspects of the operations of 1005 may be performed by a beam manager as described with reference to FIGS. 6 through 9.

At 1010, the UE may identify a first sidelink feedback configuration for the first directional beam and a second sidelink feedback configuration for the second directional beam, the second sidelink feedback configuration being different than the first sidelink feedback configuration. The operations of 1010 may be performed according to the methods described herein. In some examples, aspects of the operations of 1010 may be performed by a feedback configuration manager as described with reference to FIGS. 6 through 9.

At 1015, the UE may transmit, to the one or more UEs, an indication of the identified first sidelink feedback configuration and the second sidelink feedback configuration. The operations of 1015 may be performed according to the methods described herein. In some examples, aspects of the operations of 1015 may be performed by a feedback configuration manager as described with reference to FIGS. 6 through 9.

Figure 11:
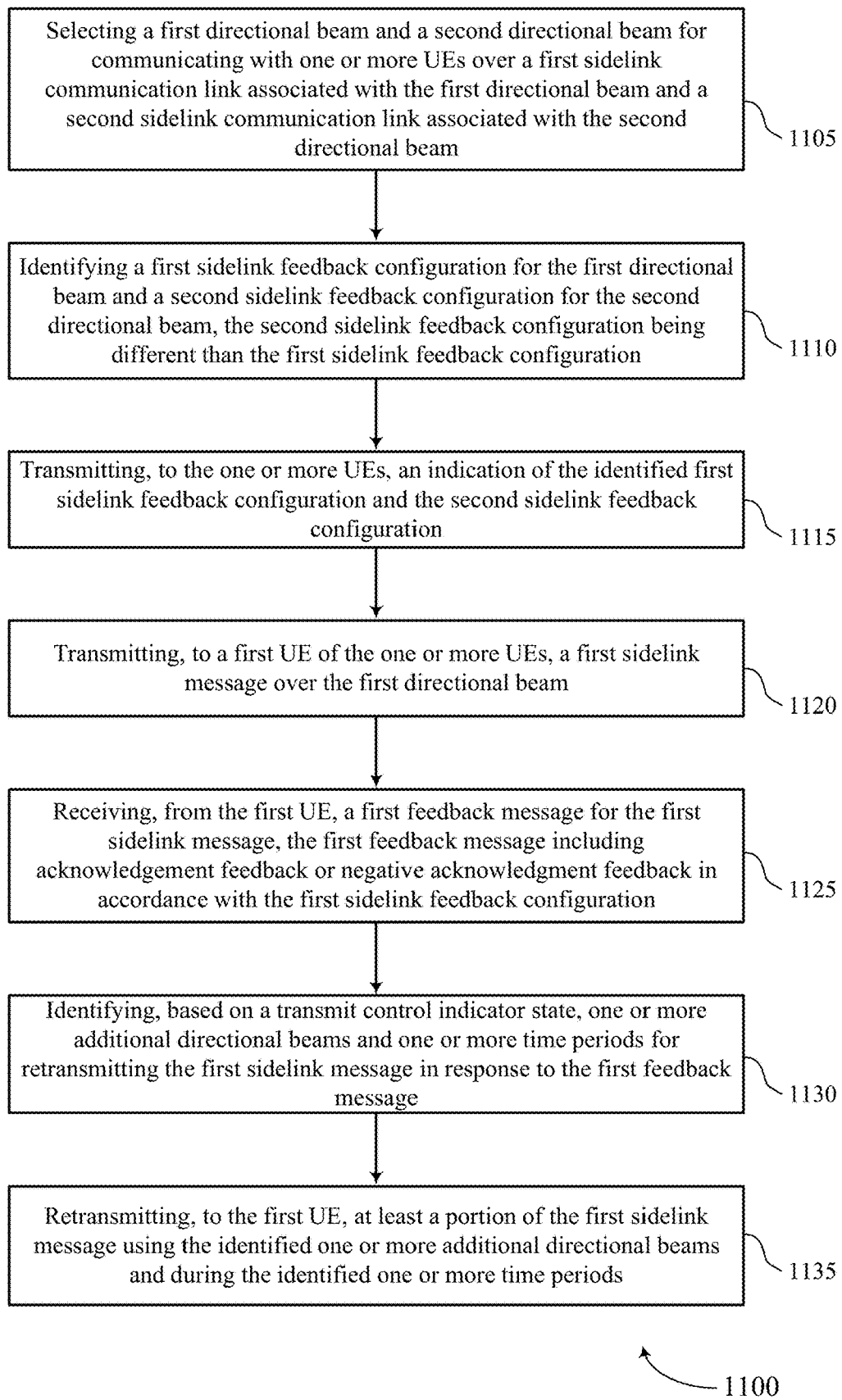

FIG. 11 shows a flowchart illustrating a method 1100 that supports techniques for configuring beam-specific feedback for sidelink communications in accordance with various aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may select a first directional beam and a second directional beam for communicating with one or more UEs over a first sidelink communication link associated with the first directional beam and a second sidelink communication link associated with the second directional beam. The operations of 1105 may be performed according to the methods described herein. In some examples, aspects of the operations of 1105 may be performed by a beam manager as described with reference to FIGS. 6 through 9.

At 1110, the UE may identify a first sidelink feedback configuration for the first directional beam and a second sidelink feedback configuration for the second directional beam, the second sidelink feedback configuration being different than the first sidelink feedback configuration. The operations of 1110 may be performed according to the methods described herein. In some examples, aspects of the operations of 1110 may be performed by a feedback configuration manager as described with reference to FIGS. 6 through 9.

At 1115, the UE may transmit, to the one or more UEs, an indication of the identified first sidelink feedback configuration and the second sidelink feedback configuration. The operations of 1115 may be performed according to the methods described herein. In some examples, aspects of the operations of 1115 may be performed by a feedback configuration manager as described with reference to FIGS. 6 through 9.

At 1120, the UE may transmit, to a first UE of the one or more UEs, a first sidelink message over the first directional beam. The operations of 1120 may be performed according to the methods described herein. In some examples, aspects of the operations of 1120 may be performed by a sidelink message component as described with reference to FIGS. 6 through 9.

At 1125, the UE may receive, from the first UE, a first feedback message for the first sidelink message, the first feedback message including acknowledgement feedback or negative acknowledgment feedback in accordance with the first sidelink feedback configuration. The operations of 1125 may be performed according to the methods described herein. In some examples, aspects of the operations of 1125 may be performed by a feedback manager as described with reference to FIGS. 6 through 9.

At 1130, the UE may identify, based on a transmit control indicator state, one or more additional directional beams and one or more time periods for retransmitting the first sidelink message in response to the first feedback message. The operations of 1130 may be performed according to the methods described herein. In some examples, aspects of the operations of 1130 may be performed by a TCI manager as described with reference to FIGS. 6 through 9.

At 1135, the UE may retransmit, to the first UE, at least a portion of the first sidelink message using the identified one or more additional directional beams and during the identified one or more time periods. The operations of 1135 may be performed according to the methods described herein. In some examples, aspects of the operations of 1135 may be performed by a retransmission manager as described with reference to FIGS. 6 through 9.

Figure 12:
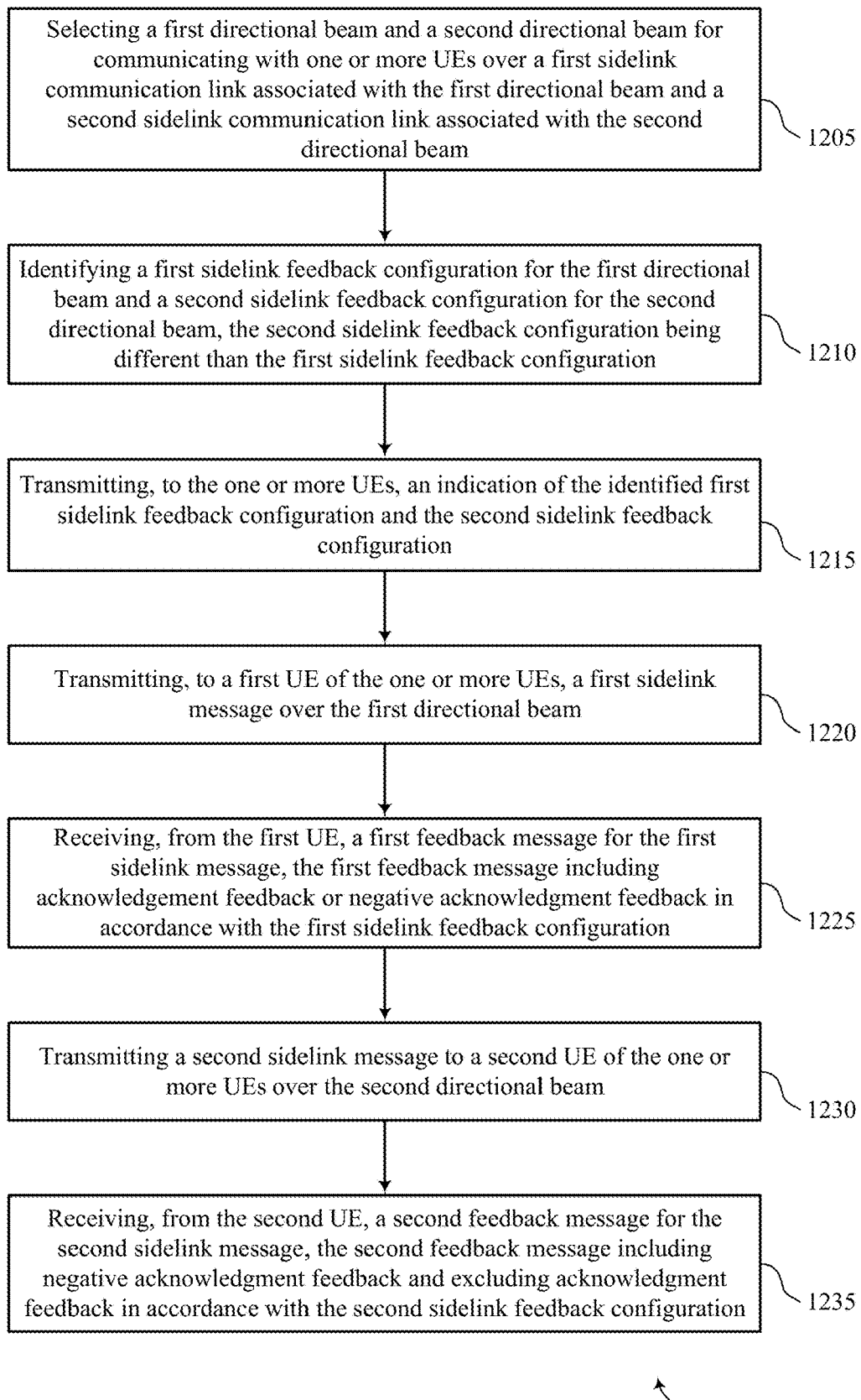

FIG. 12 shows a flowchart illustrating a method 1200 that supports techniques for configuring beam-specific feedback for sidelink communications in accordance with various aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may select a first directional beam and a second directional beam for communicating with one or more UEs over a first sidelink communication link associated with the first directional beam and a second sidelink communication link associated with the second directional beam. The operations of 1205 may be performed according to the methods described herein. In some examples, aspects of the operations of 1205 may be performed by a beam manager as described with reference to FIGS. 6 through 9.

At 1210, the UE may identify a first sidelink feedback configuration for the first directional beam and a second sidelink feedback configuration for the second directional beam, the second sidelink feedback configuration being different than the first sidelink feedback configuration. The operations of 1210 may be performed according to the methods described herein. In some examples, aspects of the operations of 1210 may be performed by a feedback configuration manager as described with reference to FIGS. 6 through 9.

At 1215, the UE may transmit, to the one or more UEs, an indication of the identified first sidelink feedback configuration and the second sidelink feedback configuration. The operations of 1215 may be performed according to the methods described herein. In some examples, aspects of the operations of 1215 may be performed by a feedback configuration manager as described with reference to FIGS. 6 through 9.

At 1220, the UE may transmit, to a first UE of the one or more UEs, a first sidelink message over the first directional beam. The operations of 1220 may be performed according to the methods described herein. In some examples, aspects of the operations of 1220 may be performed by a sidelink message component as described with reference to FIGS. 6 through 9.

At 1225, the UE may receive, from the first UE, a first feedback message for the first sidelink message, the first feedback message including acknowledgement feedback or negative acknowledgment feedback in accordance with the first sidelink feedback configuration. The operations of 1225 may be performed according to the methods described herein. In some examples, aspects of the operations of 1225 may be performed by a feedback manager as described with reference to FIGS. 6 through 9.

At 1230, the UE may transmit a second sidelink message to a second UE of the one or more UEs over the second directional beam. The operations of 1230 may be performed according to the methods described herein. In some examples, aspects of the operations of 1230 may be performed by a sidelink message component as described with reference to FIGS. 6 through 9.

At 1235, the UE may receive, from the second UE, a second feedback message for the second sidelink message, the second feedback message including negative acknowledgment feedback and excluding acknowledgment feedback in accordance with the second sidelink feedback configuration. The operations of 1235 may be performed according to the methods described herein. In some examples, aspects of the operations of 1235 may be performed by a feedback manager as described with reference to FIGS. 6 through 9.

Figure 13:
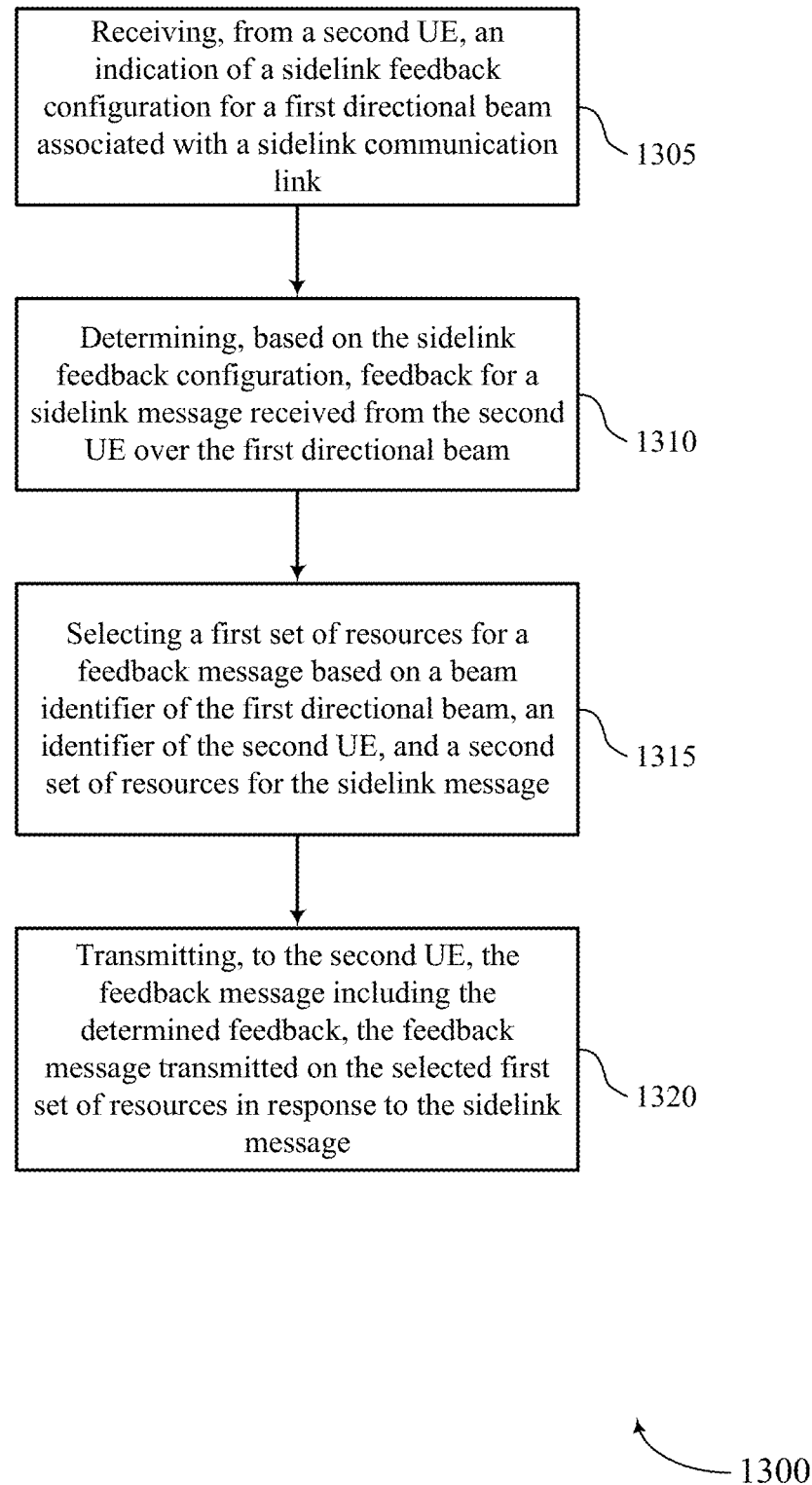

FIG. 13 shows a flowchart illustrating a method 1300 that supports techniques for configuring beam-specific feedback for sidelink communications in accordance with various aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a second UE, an indication of a sidelink feedback configuration for a first directional beam associated with a sidelink communication link. The operations of 1305 may be performed according to the methods described herein. In some examples, aspects of the operations of 1305 may be performed by a feedback configuration manager as described with reference to FIGS. 6 through 9.

At 1310, the UE may determine, based on the sidelink feedback configuration, feedback for a sidelink message received from the second UE over the first directional beam. The operations of 1310 may be performed according to the methods described herein. In some examples, aspects of the operations of 1310 may be performed by a feedback manager as described with reference to FIGS. 6 through 9.

At 1315, the UE may select a first set of resources for a feedback message based on a beam identifier of the first directional beam, an identifier of the second UE, and a second set of resources for the sidelink message. The operations of 1315 may be performed according to the methods described herein. In some examples, aspects of the operations of 1315 may be performed by a resource component as described with reference to FIGS. 6 through 9.

At 1320, the UE may transmit, to the second UE, the feedback message including the determined feedback, the feedback message transmitted on the selected first set of resources in response to the sidelink message. The operations of 1320 may be performed according to the methods described herein. In some examples, aspects of the operations of 1320 may be performed by a feedback manager as described with reference to FIGS. 6 through 9.

Figure 14:
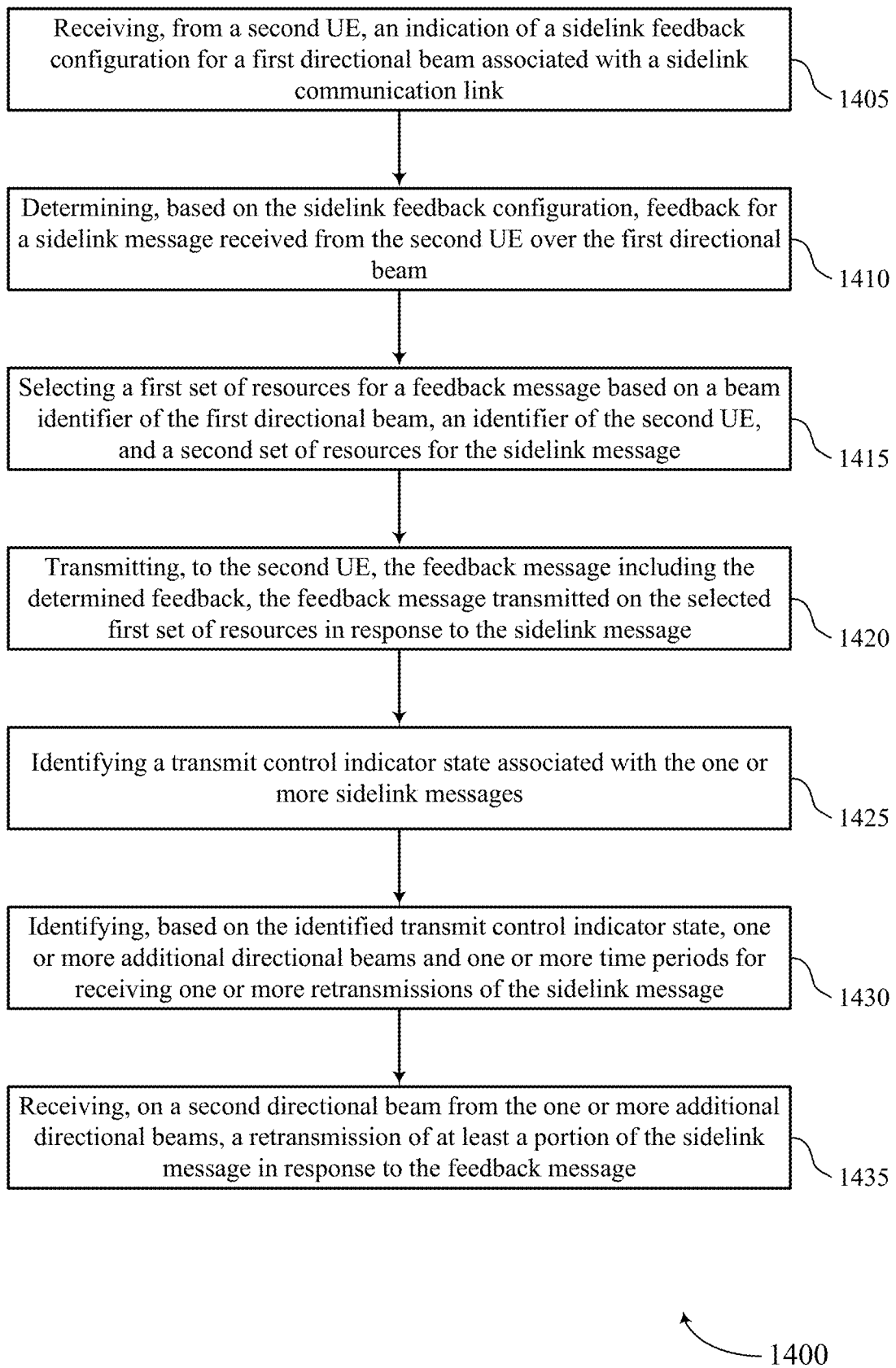

FIG. 14 shows a flowchart illustrating a method 1400 that supports techniques for configuring beam-specific feedback for sidelink communications in accordance with various aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a second UE, an indication of a sidelink feedback configuration for a first directional beam associated with a sidelink communication link. The operations of 1405 may be performed according to the methods described herein. In some examples, aspects of the operations of 1405 may be performed by a feedback configuration manager as described with reference to FIGS. 6 through 9.

At 1410, the UE may determine, based on the sidelink feedback configuration, feedback for a sidelink message received from the second UE over the first directional beam. The operations of 1410 may be performed according to the methods described herein. In some examples, aspects of the operations of 1410 may be performed by a feedback manager as described with reference to FIGS. 6 through 9.

At 1415, the UE may select a first set of resources for a feedback message based on a beam identifier of the first directional beam, an identifier of the second UE, and a second set of resources for the sidelink message. The operations of 1415 may be performed according to the methods described herein. In some examples, aspects of the operations of 1415 may be performed by a resource component as described with reference to FIGS. 6 through 9.

At 1420, the UE may transmit, to the second UE, the feedback message including the determined feedback, the feedback message transmitted on the selected first set of resources in response to the sidelink message. The operations of 1420 may be performed according to the methods described herein. In some examples, aspects of the operations of 1420 may be performed by a feedback manager as described with reference to FIGS. 6 through 9.

At 1425, the UE may identify a transmit control indicator state associated with the one or more sidelink messages. The operations of 1425 may be performed according to the methods described herein. In some examples, aspects of the operations of 1425 may be performed by a TCI manager as described with reference to FIGS. 6 through 9.

At 1430, the UE may identify, based on the identified transmit control indicator state, one or more additional directional beams and one or more time periods for receiving one or more retransmissions of the sidelink message. The operations of 1430 may be performed according to the methods described herein. In some examples, aspects of the operations of 1430 may be performed by a beam manager as described with reference to FIGS. 6 through 9.

At 1435, the UE may receive, on a second directional beam from the one or more additional directional beams, a retransmission of at least a portion of the sidelink message in response to the feedback message. The operations of 1435 may be performed according to the methods described herein. In some examples, aspects of the operations of 1435 may be performed by a retransmission manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    selecting a first directional beam and a second directional beam for communicating with one or more UEs over a first sidelink communication link associated with the first directional beam and a second sidelink communication link associated with the second directional beam;
    identifying a first sidelink feedback configuration for the first directional beam and a second sidelink feedback configuration for the second directional beam, the second sidelink feedback configuration being different than the first sidelink feedback configuration; and
    transmitting, to the one or more UEs, an indication of the identified first sidelink feedback configuration and the second sidelink feedback configuration.

2. The method of claim 1, further comprising:
    transmitting, to a first UE of the one or more UEs, a first sidelink message over the first directional beam; and
    receiving, from the first UE, a first feedback message for the first sidelink message, the first feedback message comprising acknowledgement feedback or negative acknowledgment feedback in accordance with the first sidelink feedback configuration.

3. The method of claim 2, further comprising:
    identifying, based at least in part on a transmit control indicator state, one or more additional directional beams and one or more time periods for retransmitting the first sidelink message in response to the first feedback message; and
    retransmitting, to the first UE, at least a portion of the first sidelink message using the identified one or more additional directional beams and during the identified one or more time periods.

4. The method of claim 3, further comprising:
    transmitting, to the first UE, an indication of the transmit control indicator state using sidelink control information, or radio resource control signaling, or any combination thereof.

5. The method of claim 3, further comprising:
    identifying the transmit control indicator state from a set of transmit control indicator states.

6. The method of claim 2, wherein the first feedback message is received on a first set of resources that correspond to a beam identifier of the first directional beam, an identifier of the first UE, and a second set of resources used for transmitting the first sidelink message.

7. The method of claim 2, further comprising:
    transmitting a second sidelink message to a second UE of the one or more UEs over the second directional beam; and
    receiving, from the second UE, a second feedback message for the second sidelink message, the second feedback message including negative acknowledgment feedback and excluding acknowledgment feedback in accordance with the second sidelink feedback configuration.

8. The method of claim 1, further comprising:
    determining a first priority for the first directional beam and a second priority for the second directional beam, the second priority being different than the first priority, wherein identifying the first sidelink feedback configuration for the first directional beam is based at least in part on the first priority, and wherein identifying the second sidelink feedback configuration for the second directional beam is based at least in part on the second priority.

9. The method of claim 8, wherein the first priority and the second priority are based at least in part on a location of the one or more UEs, or a movement direction of the UE, or any combination thereof.

10. The method of claim 1, wherein the first directional beam and the second directional beam are associated with a same set of physical resource blocks, a same set of subchannels, or a combination thereof.

11. The method of claim 1, wherein transmitting the indication of the identified first sidelink feedback configuration and the second sidelink feedback configuration comprises:
    transmitting sidelink control information that indicates one or both of the identified first sidelink feedback configuration or the second sidelink feedback configuration.

12. The method of claim 1, wherein transmitting the indication of the identified first sidelink feedback configuration and the second sidelink feedback configuration comprises:
    transmitting, to the one or more UEs, radio resource control signaling that indicates one or both of the identified first sidelink feedback configuration or the second sidelink feedback configuration.

13. The method of claim 1, wherein transmitting the indication of the identified first sidelink feedback configuration and the second sidelink feedback configuration comprises:
    transmitting the indication periodically, or dynamically, or any combination thereof, wherein the transmitted indication is based at least in part on a location of the one or more UEs, or a movement direction of the UE, or any combination thereof.

14. A method for wireless communication at a first user equipment (UE), comprising:
    receiving, from a second UE, an indication of a sidelink feedback configuration for a first directional beam associated with a sidelink communication link;
    determining, based at least in part on the sidelink feedback configuration, feedback for a sidelink message received from the second UE over the first directional beam;
    selecting a first set of resources for a feedback message based at least in part on a beam identifier of the first directional beam, an identifier of the second UE, and a second set of resources for the sidelink message; and transmitting, to the second UE, the feedback message comprising the determined feedback, the feedback message transmitted on the selected first set of resources in response to the sidelink message.

15. The method of claim 14, further comprising:
identifying a transmit control indicator state associated with the one or more sidelink messages;
identifying, based at least in part on the identified transmit control indicator state, one or more additional directional beams and one or more time periods for receiving one or more retransmissions of the sidelink message; and
receiving, on a second directional beam from the one or more additional directional beams, a retransmission of at least a portion of the sidelink message in response to the feedback message.

16. The method of claim 15, wherein the sidelink message is received within a first time period, and wherein the retransmission is received within the one or more time periods based at least in part on the identified transmit control indicator state, the one or more time periods being subsequent to the first time period.

17. The method of claim 15, wherein identifying the transmit control indicator state comprises:
receiving an indication of the transmit control indicator state via sidelink control information, or radio resource control signaling, or any combination thereof.

18. The method of claim 15, wherein the identified transmit control indicator state is from a set of transmit control indicator states.

19. The method of claim 14, wherein selecting the first set of resources for the feedback message comprises:
selecting a set of resource blocks, or codes, or a combination thereof, for transmitting the determined feedback based at least in part on the beam identifier of the first directional beam, the identifier of the second UE, and the second set of resources for the sidelink message.

20. The method of claim 14, wherein receiving the indication of the sidelink feedback configuration comprises:
receiving sidelink control information that indicates the sidelink feedback configuration.

21. The method of claim 14, wherein receiving the indication of the sidelink feedback configuration comprises:
receiving radio resource control signaling that indicates the sidelink feedback configuration.

22. The method of claim 14, wherein the determined feedback comprises acknowledgment feedback or negative acknowledgment feedback for the sidelink message in accordance with the sidelink feedback configuration for the first directional beam.

23. The method of claim 14, wherein the determined feedback comprises negative acknowledgment feedback and excludes acknowledgment feedback for the sidelink message in accordance with the sidelink feedback configuration for the first directional beam.

24. The method of claim 14, wherein the sidelink feedback configuration for the first directional beam is based at least in part on a priority of the first directional beam, wherein the priority is based at least in part on a location of the first UE, or a movement direction of the second UE, or any combination thereof.

25. An apparatus for wireless communication at a user equipment (UE), comprising:
a processor,
memory coupled with the processor; and
instructions stored in the memory and executable by the processor to cause the apparatus to:
select a first directional beam and a second directional beam for communicating with one or more UEs over a first sidelink communication link associated with the first directional beam and a second sidelink communication link associated with the second directional beam;
identify a first sidelink feedback configuration for the first directional beam and a second sidelink feedback configuration for the second directional beam, the second sidelink feedback configuration being different than the first sidelink feedback configuration; and
transmit, to the one or more UEs, an indication of the identified first sidelink feedback configuration and the second sidelink feedback configuration.

26. The apparatus of claim 25, wherein the instructions are further executable by the processor to cause the apparatus to:
transmit, to a first UE of the one or more UEs, a first sidelink message over the first directional beam; and
receive, from the first UE, a first feedback message for the first sidelink message, the first feedback message comprising acknowledgement feedback or negative acknowledgment feedback in accordance with the first sidelink feedback configuration.

27. The apparatus of claim 26, wherein the instructions are further executable by the processor to cause the apparatus to:
identify, based at least in part on a transmit control indicator state, one or more additional directional beams and one or more time periods for retransmitting the first sidelink message in response to the first feedback message; and
retransmit, to the first UE, at least a portion of the first sidelink message using the identified one or more additional directional beams and during the identified one or more time periods.

28. The apparatus of claim 26, wherein the instructions are further executable by the processor to cause the apparatus to:
transmit a second sidelink message to a second UE of the one or more UEs over the second directional beam; and
receive, from the second UE, a second feedback message for the second sidelink message, the second feedback message including negative acknowledgment feedback and excluding acknowledgment feedback in accordance with the second sidelink feedback configuration.

29. An apparatus for wireless communication at a first user equipment (UE), comprising:
a processor,
memory coupled with the processor; and
instructions stored in the memory and executable by the processor to cause the apparatus to:
receive, from a second UE, an indication of a sidelink feedback configuration for a first directional beam associated with a sidelink communication link;
determine, based at least in part on the sidelink feedback configuration, feedback for a sidelink message received from the second UE over the first directional beam;
select a first set of resources for a feedback message based at least in part on a beam identifier of the first directional beam, an identifier of the second UE, and a second set of resources for the sidelink message; and transmit, to the second UE, the feedback message comprising the determined feedback, the feedback message transmitted on the selected first set of resources in response to the sidelink message.

30. The apparatus of claim 29, wherein the instructions are further executable by the processor to cause the apparatus to:

identify a transmit control indicator state associated with the one or more sidelink messages;

identify, based at least in part on the identified transmit control indicator state, one or more additional directional beams and one or more time periods for receiving one or more retransmissions of the sidelink message; and receive, on a second directional beam from the one or more additional directional beams, a retransmission of at least a portion of the sidelink message in response to the feedback message.

* * * * *